US012226354B2

(12) United States Patent
Cooke

(10) Patent No.: US 12,226,354 B2
(45) Date of Patent: Feb. 18, 2025

(54) SYSTEMS FOR PATIENT POSITIONING, AND SURGICAL METHODS EMPLOYING SUCH SYSTEMS

(71) Applicant: Cameron J. Cooke, Brisbane (AU)

(72) Inventor: Cameron J. Cooke, Brisbane (AU)

( * ) Notice: Subject to any disclaimer, the term of this patent is extended or adjusted under 35 U.S.C. 154(b) by 446 days.

(21) Appl. No.: 17/776,544

(22) PCT Filed: Nov. 11, 2020

(86) PCT No.: PCT/IB2020/060629
§ 371 (c)(1),
(2) Date: May 12, 2022

(87) PCT Pub. No.: WO2021/094955
PCT Pub. Date: May 20, 2021

(65) Prior Publication Data

US 2022/0395415 A1 Dec. 15, 2022

Related U.S. Application Data

(60) Provisional application No. 62/934,947, filed on Nov. 13, 2019.

(51) Int. Cl.
*A61G 13/10* (2006.01)
*A61G 13/00* (2006.01)
(Continued)

(52) U.S. Cl.
CPC ....... *A61G 13/123* (2013.01); *A61G 13/0036* (2013.01); *A61G 13/04* (2013.01)

(58) Field of Classification Search
CPC ........ A61G 31/10; A61G 13/00; A61G 13/12; A61G 13/123; A61G 13/0036; A61G 13/04; A61G 13/0081; A61G 13/1285
See application file for complete search history.

(56) References Cited

U.S. PATENT DOCUMENTS 6,934,987 B2 8/2005 Newkirk et al.
12,090,095 B2 * 9/2024 Henderson ......... A61G 13/1205
(Continued)

FOREIGN PATENT DOCUMENTS

CN 201516129 U 6/2010
CN 104114058 A 10/2014
(Continued)

OTHER PUBLICATIONS

International Search Report and Written Opinion dated Feb. 15, 2021, from International Patent Application No. PCT/IB2020/060629, 9 pp.
(Continued)

*Primary Examiner* — Fredrick C Conley
(74) *Attorney, Agent, or Firm* — Klarquist Sparkman, LLP

(57) ABSTRACT

A surgical positioning system includes a platform assembly and an alignment post coupled to the platform assembly. The platform assembly has first and second members and an elevation assembly. The first member is supported on a surgical operating table. The second member is arranged over the first member and supports thereon a first portion of a patient undergoing surgery. The elevation assembly moves the second member with respect to the first member so as to change an elevation of the first portion of the patient. In some embodiments, a positioning member is coupled to the alignment post. The positioning member is inflatable between a deflated state and an inflated state in order to displace part of the patient thereon vertically and laterally. In some embodiments, the surgical positioning system can be used to position the anatomy of a patient during a hip replacement surgery.

20 Claims, 26 Drawing Sheets

(51) Int. Cl.

| | |
|---|---|
| ***A61G 13/12*** | (2006.01) |
| *A61G 13/04* | (2006.01) |

(56) References Cited

U.S. PATENT DOCUMENTS

| | | | |
|---|---|---|---|
| 2004/0133979 A1* | 7/2004 | Newkirk | A61F 5/3761 5/624 |
| 2006/0123546 A1 | 6/2006 | Horton et al. | |
| 2013/0081635 A1* | 4/2013 | Drake | A61F 5/04 128/845 |
| 2014/0130260 A1 | 5/2014 | Kreuzer et al. | |
| 2015/0135441 A1 | 5/2015 | Sommer et al. | |
| 2015/0164724 A1 | 6/2015 | Drake et al. | |
| 2015/0290064 A1 | 10/2015 | Kreuzer | |
| 2018/0256424 A1 | 9/2018 | Borges de Abreu et al. | |
| 2019/0151179 A1 | 5/2019 | Siccardi et al. | |

FOREIGN PATENT DOCUMENTS

| | | | |
|---|---|---|---|
| CN | 105232285 | A | 1/2016 |
| CN | 208259883 | U | 12/2018 |
| CN | 109152690 | A | 1/2019 |
| CN | 109998686 | A | 7/2019 |
| KR | 10-2018-0004847 | | 1/2018 |
| WO | WO 2014/188585 | | 11/2014 |

OTHER PUBLICATIONS

Office Action (including English translation) from China National Intellectual Property Administration (CNIPA), for Chinese Patent Application No. 202080092711.X, dated Jul. 8, 2023, 32 pages.

Extended European Search Report dated Oct. 16, 2023, from European Patent Application No. 20888074.0, 6 pp.

* cited by examiner

SYSTEMS FOR PATIENT POSITIONING, AND SURGICAL METHODS EMPLOYING SUCH SYSTEMS

CROSS REFERENCE TO RELATED APPLICATION

This application is the U.S. National Stage of International Application No. PCT/IB2020/060629, filed Nov. 11, 2020, which was published in English under PCT Article 21(2), which in turn claims the benefit of U.S. Provisional Application No. 62/934,947, entitled "Systems for Patient Positioning, and Surgical Methods Employing Such Systems," filed Nov. 13, 2019, which is incorporated by reference herein in its entirety.

FIELD

The present disclosure relates generally to surgery and systems for positioning of a patient during surgery, and more particularly, to positioning of the pelvic, hip, and/or leg regions of the patient.

BACKGROUND

Surgical replacement of the hip joint with a prosthetic implant can be achieved using a posterior, lateral, anterolateral, or anterior approach. Among the approaches, the Direct Anterior Approach (DAA) is relatively new and offers faster recovery and less pain, while reducing the risk of dislocation. DAA also may allow for the use of intra-operative X-ray in order to improve implant positioning, thereby reducing the risk of leg length discrepancies and/or implant malposition.

Many DAA hip replacement surgeries are performed using a specialized traction table (e.g., HANA® table) that can position the patient's legs during the surgical procedure. However, such specialized traction tables may add significant cost to the surgery. Each table itself is relatively expensive (e.g., $100,000) and requires extra experienced personnel to operate during surgery. Moreover, initial setup and configuration of the patient on the table may add time to each surgery. The traction table also immobilizes the patient's legs in foot holders, which may interfere with the surgeon's ability to check for instability in flexion and internal rotation without otherwise removing the foot from the holder.

DAA hip replacement surgeries may also be performed using a non-specialized or standard operating table, thereby avoiding the extra expense associated with the specialized traction table. For example, an operating table can be "broken" by angling the leg support and/or torso support sections down, thereby elevating the pelvis in order to allow extension of the hip and/or exposure of the femur. However, the standard operating table only provides limited angling and otherwise lacks the ability to optimally position the patient's legs during surgery, which may prevent adequate exposure of bones to the surgeon. Moreover, the arrangement of support sections of the operating table required to provide such angling may inhibit intra-operative X-ray imaging due to the location of the operating table support column under the pelvis.

Embodiments of the disclosed subject matter may address one or more of the above-noted problems or disadvantages, among other things.

SUMMARY

Embodiments of the disclosed subject matter employ systems for positioning parts of a patient during surgery, for example, to provide control of the positions of the pelvis and legs of the patient during a hip replacement surgery. Components of the disclosed systems can elevate the pelvis with respect to other parts of the patient (e.g., legs). Components of the disclosed systems can also simultaneously elevate and lateralize a part of the patient (e.g., proximal femur) with respect to the pelvis. The disclosed systems can be constructed as modular units adapted for use with standard surgical operating tables, or can form integral parts of new types of surgical operating tables.

In one or more representative embodiments, a system for positioning a patient during surgery can comprise a platform assembly and an alignment post. The platform assembly can comprise a first member, a second member, and an elevation assembly. The first member can be constructed to be supported on a surgical operating table. The second member can be arranged over the first member and can be constructed to support thereon at least a first portion of a patient undergoing surgery. The elevation assembly can be constructed to move the second member with respect to the first member so as to change an elevation of the first portion of the patient with respect to a second portion of the patient. The alignment post coupled to the platform assembly.

In some embodiments, the system further comprises a positioning member coupled to the alignment post and supported on the second member. The positioning member can be inflatable between a deflated state and an inflated state. In the inflated state, the positioning member can displace part of the patient thereon vertically with respect to the second member and laterally with respect to the alignment post as compared to the positioning member in the deflated state.

In one or more representative embodiments, a system for positioning a patient during surgery can comprise first means for elevating at least a portion of a pelvis of a patient supported on a surgical operating table, and second means for elevating and lateralizing a femur of the patient.

In one or more representative embodiments, a method can comprise providing a surgical operating table with a platform assembly of a surgical positioning system. The platform assembly can comprise a first member, a second member, and an elevation assembly. The first member can be supported on the surgical operating table. The second member can be arranged over the first member. The elevation assembly can be constructed to vertically move the second member with respect to the first member. The method can further comprise disposing a patient on the surgical operating table with at least a portion of a pelvis of the patient being supported on the second plate member, and arranging an alignment post of the surgical positioning with respect to a groin region of the patient. The method can also comprise installing an inflatable positioning member on the alignment post such that at least a portion of the inflatable positioning member is between the second plate member and a leg or buttock of the patient, and performing a surgery on the patient. The performing the surgery can comprise elevating the supported portion of the pelvis of the patient by actuating the elevation assembly of the platform assembly, elevating and/or lateralizing a femur of the patient by changing inflation of the inflatable positioning member, or any combination thereof.

In some embodiments, the performed surgery is a hip replacement surgery employing the direct anterior approach.

Any of the various innovations of this disclosure can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

BRIEF DESCRIPTION OF THE DRAWINGS

Embodiments will hereinafter be described with reference to the accompanying drawings, which have not necessarily been drawn to scale. Where applicable, some elements may be simplified or otherwise not illustrated in order to assist in the illustration and description of underlying features. Throughout the figures, like reference numerals denote like elements.

DETAILED DESCRIPTION

In embodiments, a surgical positioning system is used to position parts of a patient, for example, to elevate parts with respect to other parts of the patient to improve access to certain anatomical features during surgery. In some embodiments, the surgical positioning system can be used in hip replacement surgery to elevate the pelvis during some stages of the surgery and to elevate and lateralize the femur during other stages of the surgery. The surgical positioning system can be added to a standard surgical operating table without fixtures or traction elements for positioning the legs of the patient.

Figure 1:
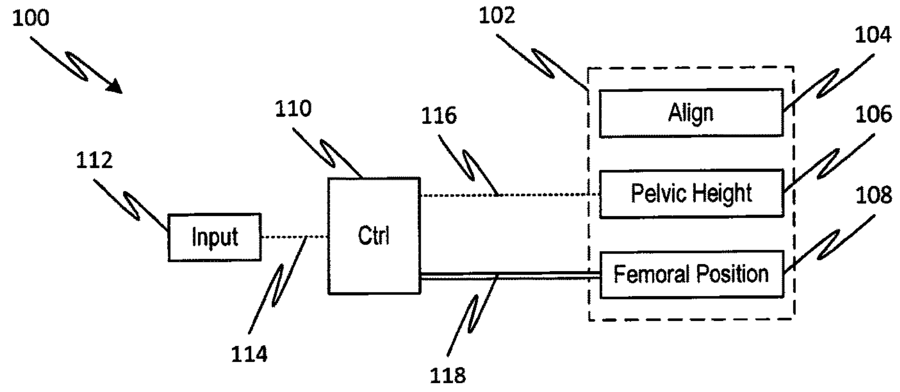
FIG. 1 is a generalized schematic diagram illustrating aspects of a surgical positioning system, according to one or more embodiments of the disclosed subject matter.

FIG. 1 illustrates generalized features of an exemplary surgical positioning system 100 for hip replacement surgery. The surgical positioning system 100 can include a platform assembly 102 and a control module 110. The platform assembly 102 sits atop the surgical operating table and supports at least part of the pelvic region of the patient thereon. The platform assembly 102 can include a first mechanism 104 that provides lateral alignment (e.g., left-right) of the pelvic region of the patient on the surgical operating table and a second mechanism 106 that adjusts an elevation or height of the pelvic region of the patient with respect to the surgical operating table. For example, the elevation of the pelvic region can allow for extension of the hip of the patient, which can offer better exposure of the hip joint during replacement thereof.

In some embodiments, the platform assembly 102 can also include a third mechanism 108 that adjusts the position of an upper leg or buttock region of the patient. In other embodiments, the third mechanism 108 is a separate component that is coupled to part of the platform assembly 102 during surgery. In any embodiment, the third mechanism 108 can control, for example, elevation and lateral location of the proximal femur of the patient with respect to other parts of the patient (e.g., the pelvic region), which may make broaching of the femur easier.

The control module 110 can be operatively coupled to one or more components of the platform assembly 102 to provide actuation thereof. In some embodiments, the first mechanism 104 can be in a fixed position. Alternatively or additionally, in some embodiments, the first mechanism 104 can be manually actuatable from an initial stowed position to a deployed position for surgery. Alternatively or additionally, in some embodiments, the first mechanism 104 can be detachable from the platform assembly. In such configurations, the first mechanism 104 can be attached in position after a patient is disposed on the platform assembly for surgery. In some embodiments, the second mechanism 106 can be actuated using electrical power. For example, connection 116 between control module 110 and second mechanism 106 can be used to provide electrical control signals and/or electrical power to an actuator of the second mechanism 106 to provide the desired amount of elevation. Alternatively or additionally, in some embodiments, the second mechanism 106 can be actuated using hydraulic or pneumatic power. For example, connection 116 can be a hydraulic line that provides pressurized fluid to or withdraws fluid from the second mechanism 106 to provide a desired amount of elevation. In some embodiments, the third mechanism 108 can actuated using hydraulic or pneumatic power. For example, connection 118 between control module 110 and third mechanism 108 can provide pressurized air to or withdraw air from the third mechanism to provide the desired amount of elevation and/or lateralization. In some embodiments, any of the first mechanism 104, second mechanism 106, and third mechanism 108 can employ any one of manual actuation, electrical actuation, pneumatic actuation, or combinations thereof.

In some embodiments, the control module 110 is disposed on the floor of the operating theater, for example, underneath or otherwise nearby to the surgical operating table. In other embodiments, the control module 110 can be disposed on a portion of the operating table, a surgical cart proximal to the operating table, a wall of the operating theater, or any other stationary or mobile structure. In still other embodiments, the control module 110 can be integrated with the surgical operating table itself, for example, as part of the table base, support column, or patient supporting panels of the surgical operating table.

In some embodiments, the control module 110 is operatively coupled to an input unit 112 (e.g., via wired or wireless connection 114) to receive commands for control of the components of the platform assembly 102 during surgery of the patient. The control module 110 thus translates the input commands from the input unit 112 into electrical signals (or movement of hydraulic fluid or air for hydraulic or pneumatic actuation) to drive operation of the components of the platform assembly 102. For example, the input unit 112 can include one or more actuators or switches that are manually actuated by the surgeon or another operator to dictate operation of the second mechanism 106 and/or third mechanism 108. Alternatively or additionally, the input unit 112 can include an electronic display or graphical user interface by which the surgeon or another operator can define desired positioning by the second mechanism 106 and/or third mechanism 108. Alternatively or additionally, the input unit 112 can employ hands-free input, such as voice actuation, to dictate operation of the second mechanism 106 and/or third mechanism 108. It is also possible for the input unit 112 to employ other techniques or mechanisms according to one or more contemplated embodiments.

The surgical positioning system 100 can thus enable multiple hip positioning options, including hip extension, elevation, and lateralization. These multiple hip positioning options allow for excellent exposure and delivery of the femur. As a result, rapid primary hip replacement procedures can be achieved. Moreover, the multiple hip positioning options offered by the surgical positioning system 100 can further assist with more complex hip replacement scenarios, such as obese patients, patients having significant muscle mass, and patients having an underlying deformity.

Referring now to FIGS. 2-12E, an exemplary surgical positioning system 200 is shown. The surgical positioning system 200 includes a platform assembly 202 (also known as a pelvic elevation platform), a control unit or module 204 (also known as a control box), and an input unit 206 (e.g., left foot pedal 206*a* and right foot pedal 206*b*, also known as a foot pedal system). Although not shown in the figures for clarity of illustration, the control module 204 is operatively connected to the platform assembly 202 by power supply conduits (e.g., electrical, hydraulic, and/or pneumatic) and to the input unit 206 by respective signal lines (e.g., electrical, hydraulic, and/or pneumatic). The surgeon operating on a patient 320 disposed on surgical operating table 210 can thus interact with the input unit 206 to directly control positioning of the patient by the platform assembly 202.

Figure 2:
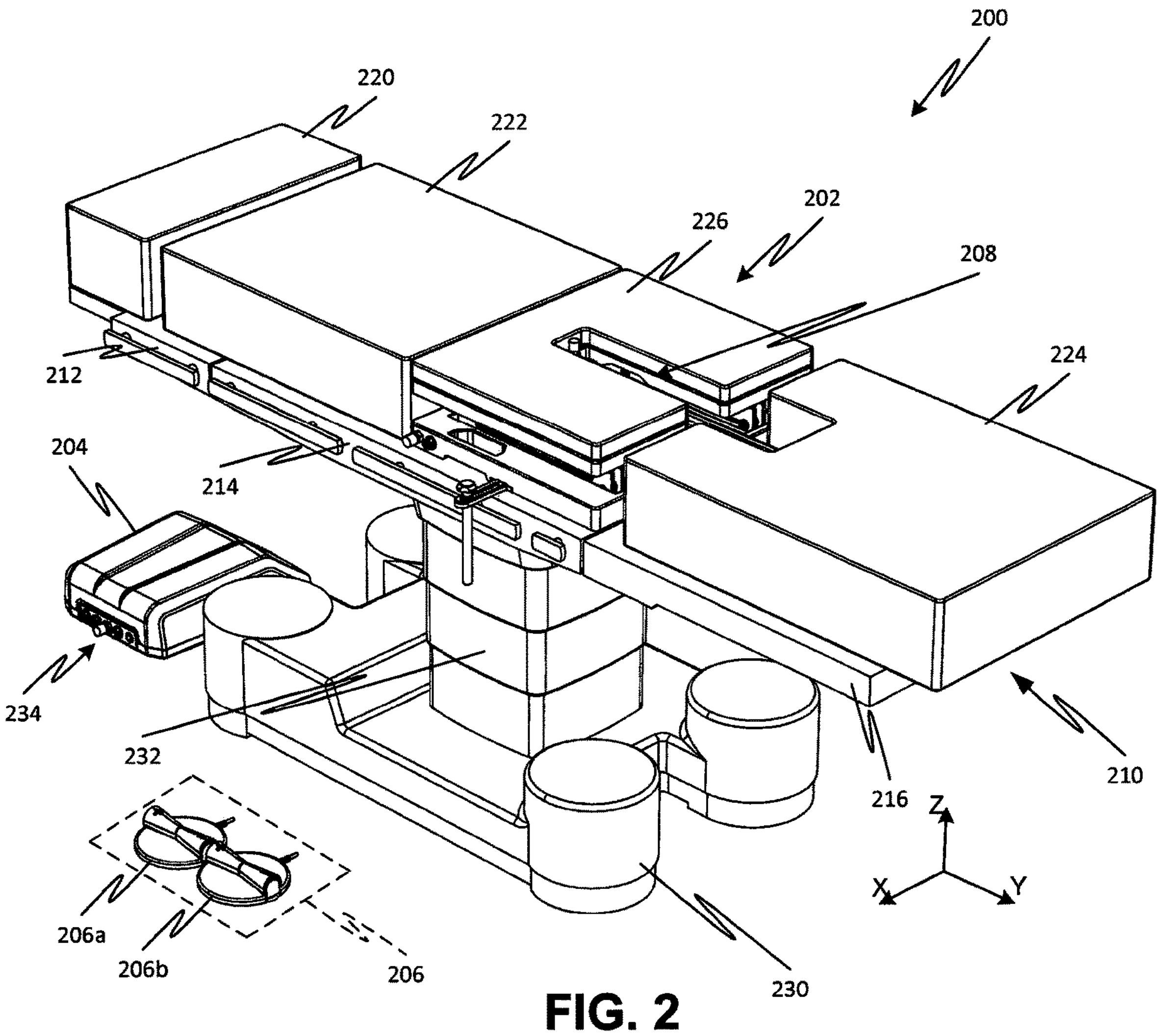
FIG. 2 is a perspective view of a surgical operating table employing a first example of a surgical positioning system, according to one or more embodiments of the disclosed subject matter.
Figure 3A:
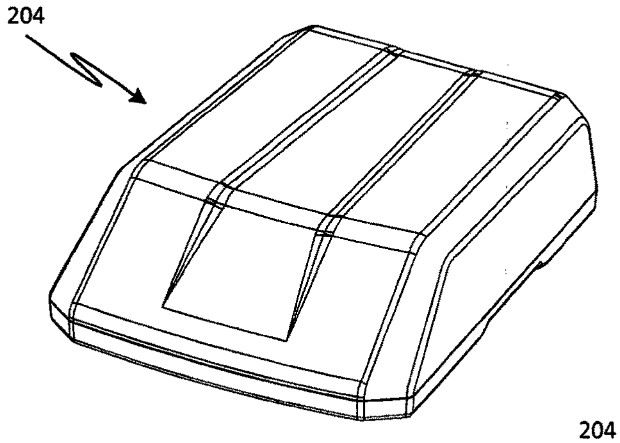
FIGS. 3A, 3B, 3C, and 3D are perspective, interior, rear, and exploded views, respectively, of an exemplary control unit of the surgical positioning system, according to one or more embodiments of the disclosed subject matter.
Figure 3B:
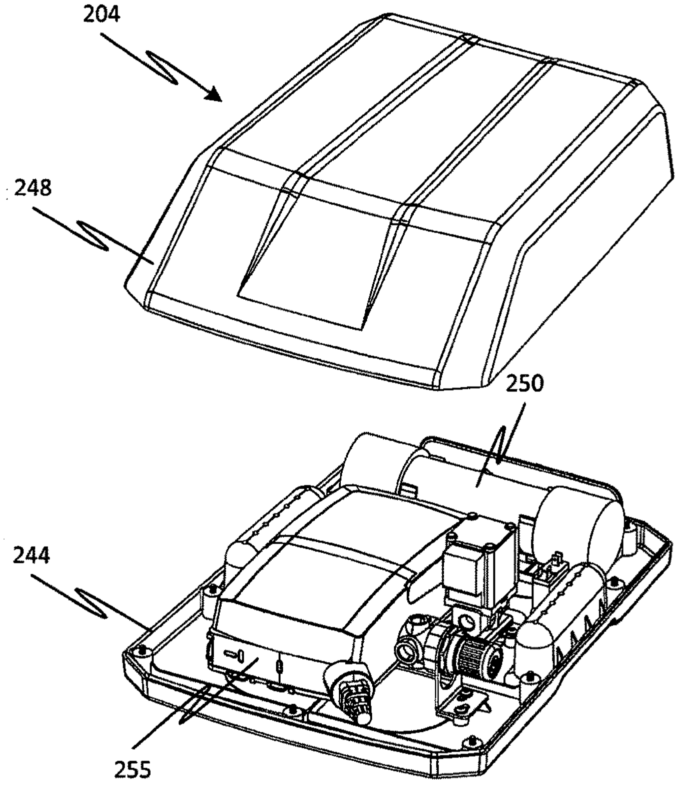
Figure 3C:
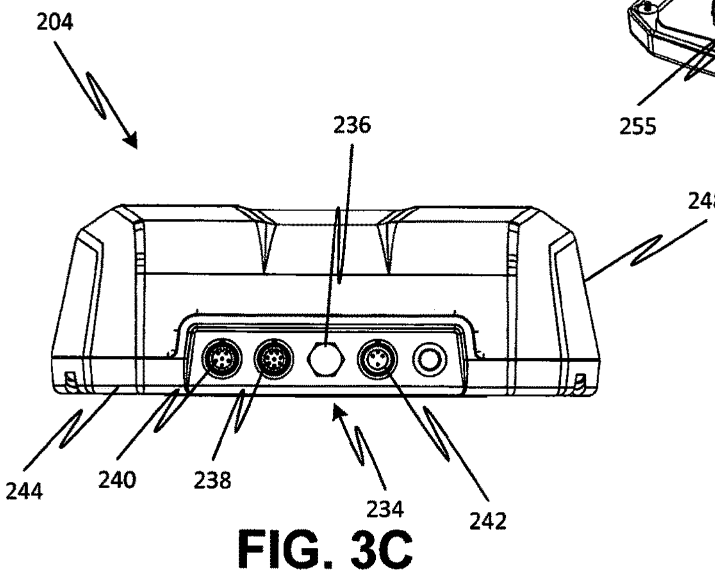
Figure 3D:
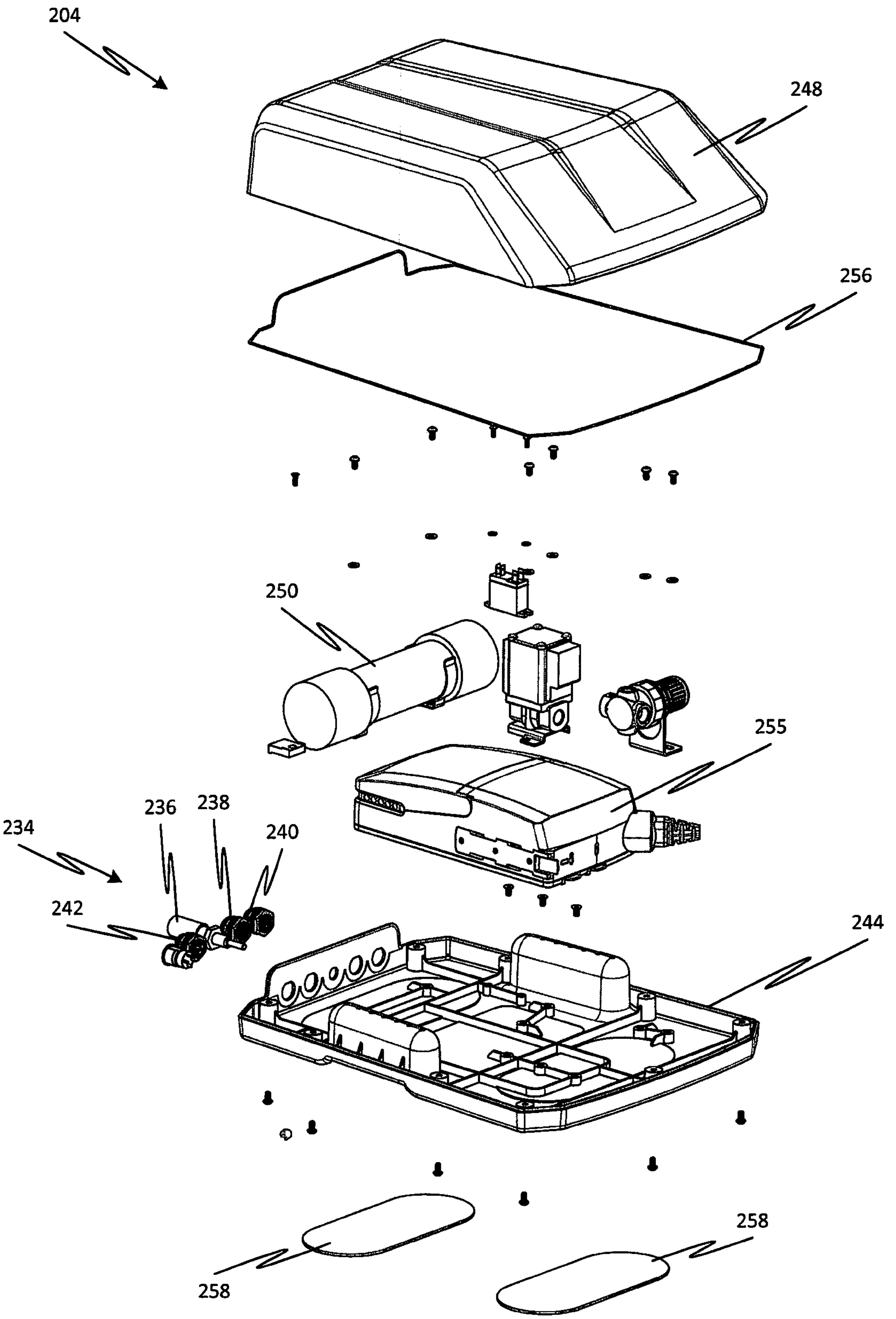

In the illustrated example of FIG. 2, the platform assembly 202 is disposed on surgical operating table 210, in particular, a torso support panel 214 of the operating table 210. The surgical operating table 210 has a head support panel 212 and a leg support panel 216 on opposite sides of the torso support panel 214 along a longitudinal (Y) direction. Each of the support panels 212-216 can be separately articulated (e.g., angled with respect to each other) and/or can be displaced along the longitudinal direction. For example, the panels 212-216 can be translated in a direction from the head support panel 212 toward the leg support panel 216 to allow for positioning of a detector or source (e.g., X-ray) of an imaging system to image the torso or pelvis of the patient 320. The surgical operating table 210 can further include a base 230, which may be integrated with a floor of the operating theater or movable (e.g., casters or wheels). Supporting the panels 212-216 on base 230 is a support column 232, which may have an adjustable height (e.g., telescoping extending along the Z-direction) or have a static height.

Each of the support panels 212, 214, 216 of the surgical operating table 210 can have respective support pads 220, 222, 224 (e.g., cushions) thereon. In some embodiments, the support pads 220-224 are part of the surgical positioning system and are installed together with the platform assembly 202. In other embodiments, the support pads 220-224 are part of the operating table 210. The platform assembly 202 can be disposed between the torso support pad 222 and the leg support pad 224 along the longitudinal direction, so as to support a pelvic region of the patient 320 thereon. In some embodiments, a height (e.g., along the Z-direction) of the platform assembly 202 in the initial, non-extended position may be substantially equal to that of adjacent portions of the torso support pad 222 and the leg support pad 224.

As shown in FIG. 2, the control module 204 can be disposed on the floor underneath a portion of the operating table 210 and oriented to allow convenient routing of wiring and conduits to respective connectors of the input unit 206 and/or the platform assembly 202. In particular, the control module 204 can have an input/output (I/O) connector panel 234 that faces toward a side of the operating table 210 where the input unit 206 is disposed and/or where connectors 274, 276 of the platform assembly 202 are disposed. The I/O connector panel 234 can have electrical connectors 238, 240 (FIG. 3C) that are connected to the foot control pedals 206*a*, 206*b* respectively. The I/O connector panel 234 can further have a pneumatic connector 236 (FIG. 3C) that is connected to pneumatic connector 274 of the platform assembly 202, and another electrical connector 242 (FIG. 3C) that is connected to electrical connector 276 of the platform assembly 202.

As shown in FIGS. 3A-3D, the control module 204 has a housing the encloses various components. The housing can be formed by a top cover 248 and a bottom support plate 244. A seal 256 (e.g., O-ring) is provided between the perimeters of the top cover 248 and bottom plate 244. Bottom plate 244 may have one or more feet 258 (e.g., rubberized feet) on a bottom surface, which feet rest on the floor or other surface in the operating theater. To provide pneumatic control, the control module 204 can include a pneumatic source 250 (e.g., rotary vane pump), a first valve (e.g., solenoid valve), and a second valve (e.g., pressure release or safety valve). To provide electrical power/control, the control module 204 can include an electrical power source 255 (e.g., power converter or transformer, battery, etc.). Again, electrical wiring and pneumatic lines are not shown in FIGS. 3B-3D in order to more clearly illustrate the underlying components.

Referring to FIGS. 4A-4D, the platform assembly 202 can have a bottom plate 266 (also known as a base plate), a top plate 264, one or more elevation assemblies 268, and an alignment post 260 (also known as a dynamic peritoneal post). Alternatively, in some embodiments, the alignment post 260 can be considered a separate component that is coupled to the platform assembly 202. The bottom plate 266 is supported on the support panel of the surgical operating table and attached thereto by one or more mounting rails 272. The bottom plate 266 can also include connections to the control module 204, such as pneumatic connector 274 and electrical connector 276. Handles 296 (FIG. 4C) can be formed in the bottom plate 266 to allow hand carrying and/or positioning of the platform assembly 202. Bottom plate 266 may have one or more feet 284 (e.g., rubberized feet) on a bottom surface, which feet rest on a surface of the operating table 210. A cover 282 may be provided on otherwise exposed components of the bottom surface of the bottom plate 266.

The top plate 264 can have support padding 226 over an upper surface thereof, which padding 226 supports the pelvic region of the patient 320 thereon. The top plate 264 and the support padding 226 can have a centrally-located (with respect to lateral X-direction) slot 208 through which alignment post 260 can vertically extend. The alignment post 260 is rotatable in the Y-Z plane from an initial stow position (see FIGS. 5A-5B), where the alignment post 260 is substantially horizontal and disposed between the top plate 264 and the bottom plate 266, to a deployed position (see FIGS. 4B, 8A-8C), where the alignment post 260 is substantially vertical and extends through the slot 208.

Figure 4A:
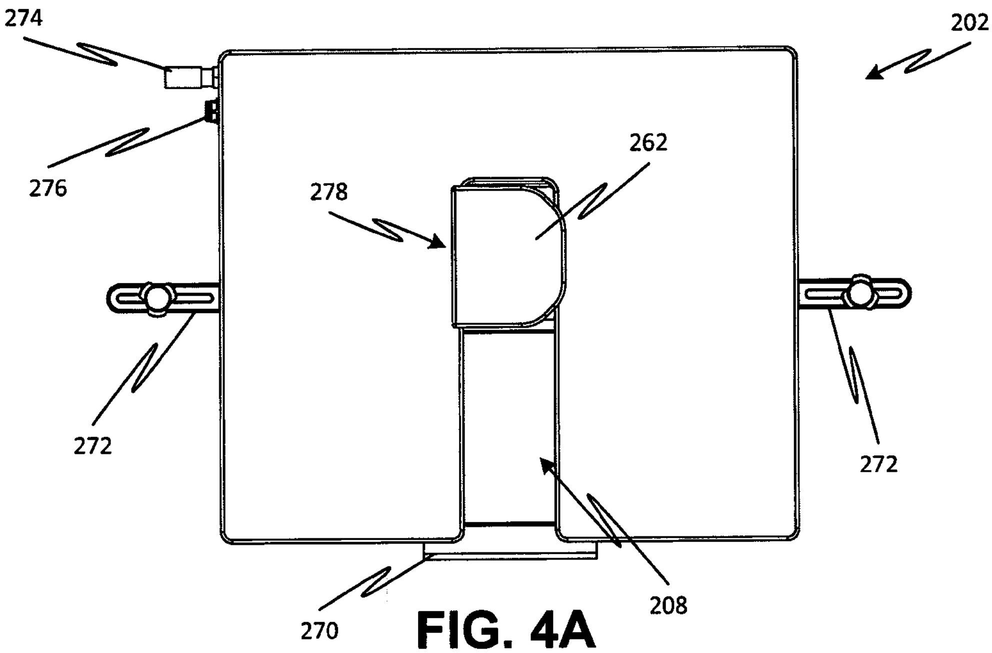
FIGS. 4A, 4B, and 4C are top, side, and exploded views, respectively, of an exemplary platform assembly of the surgical positioning system, according to one or more embodiments of the disclosed subject matter.
Figure 4B:
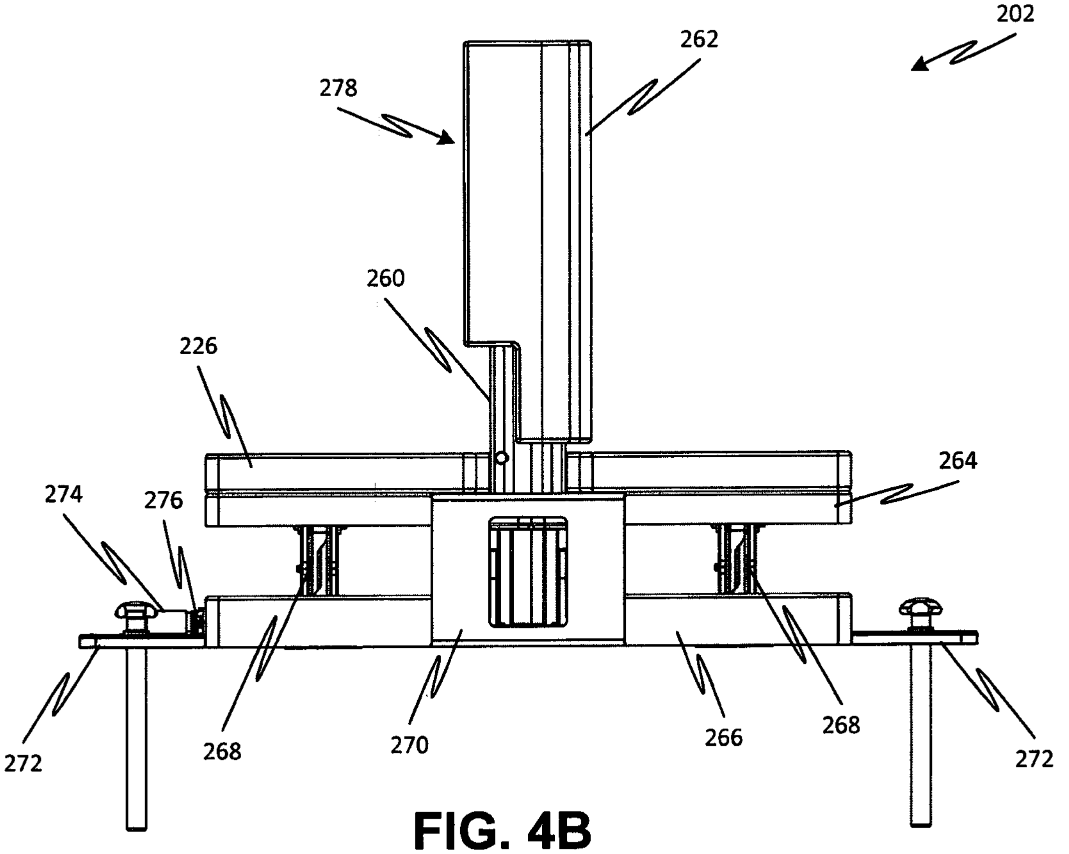
Figure 4C:
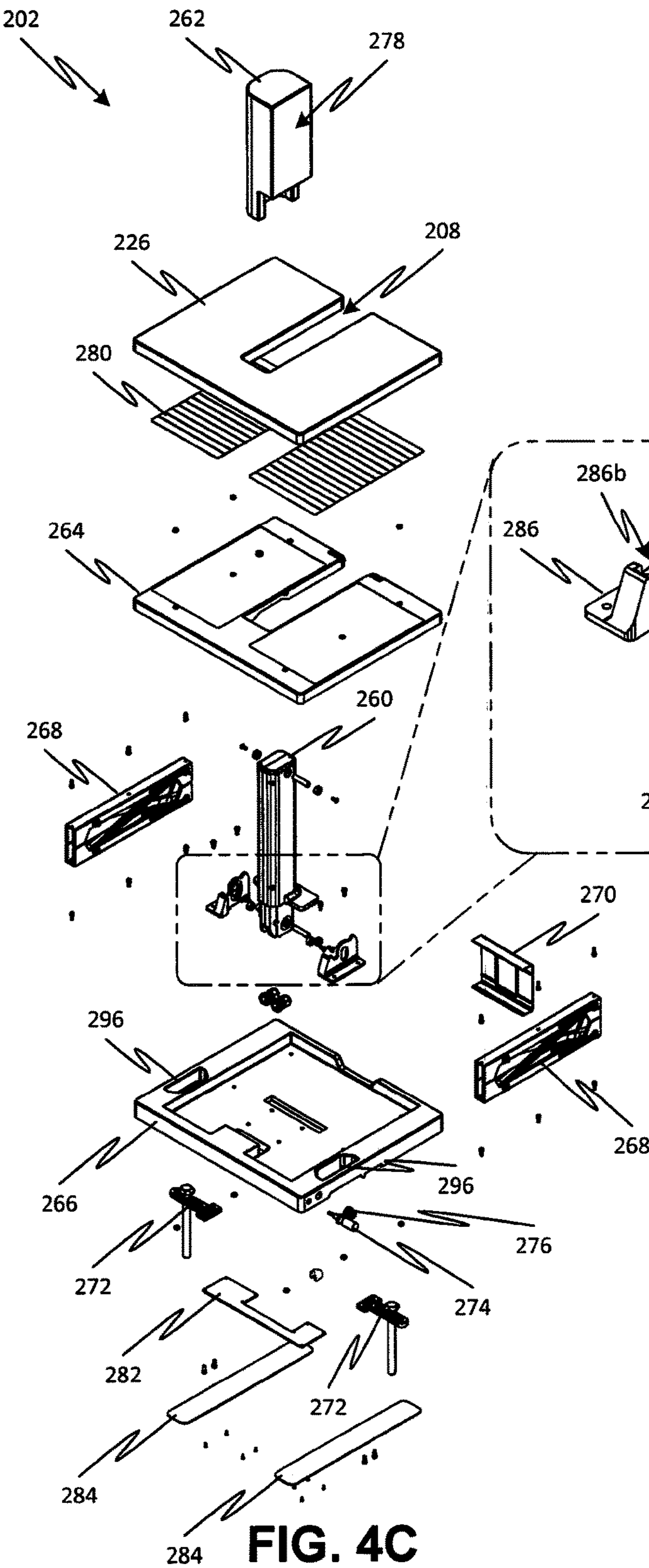
Figure 4D:
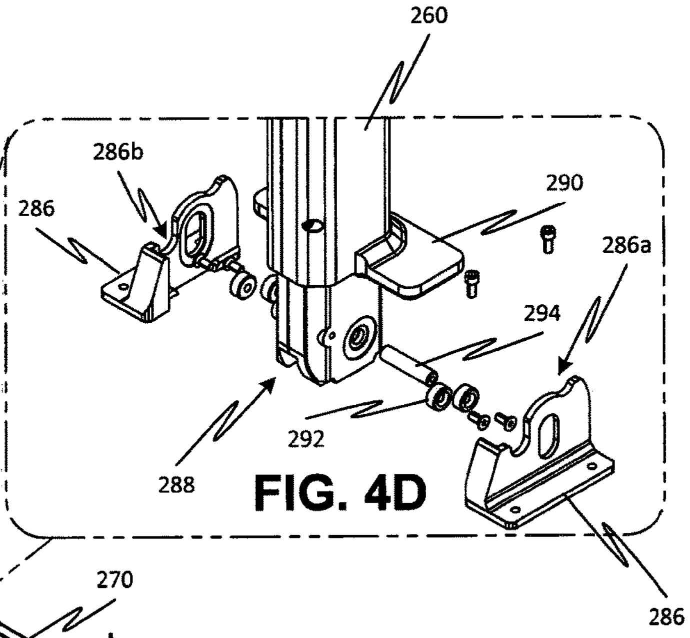
FIG. 4D is a close-up view of a portion of the platform assembly of FIG. 4C.
Figure 7A:
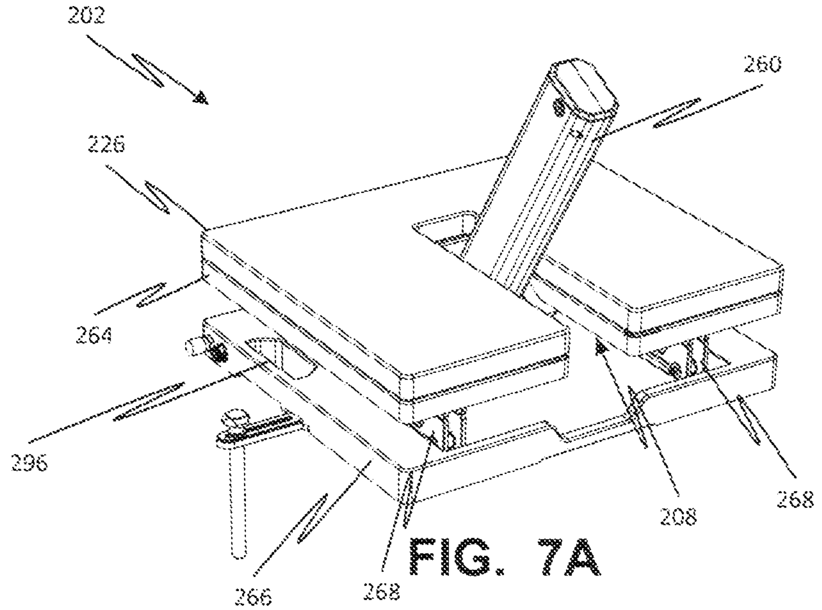
FIGS. 7A-7B are perspective and side cross-sectional views, respectively, illustrating partial rotation of the alignment post of the platform assembly.
Figure 7B:
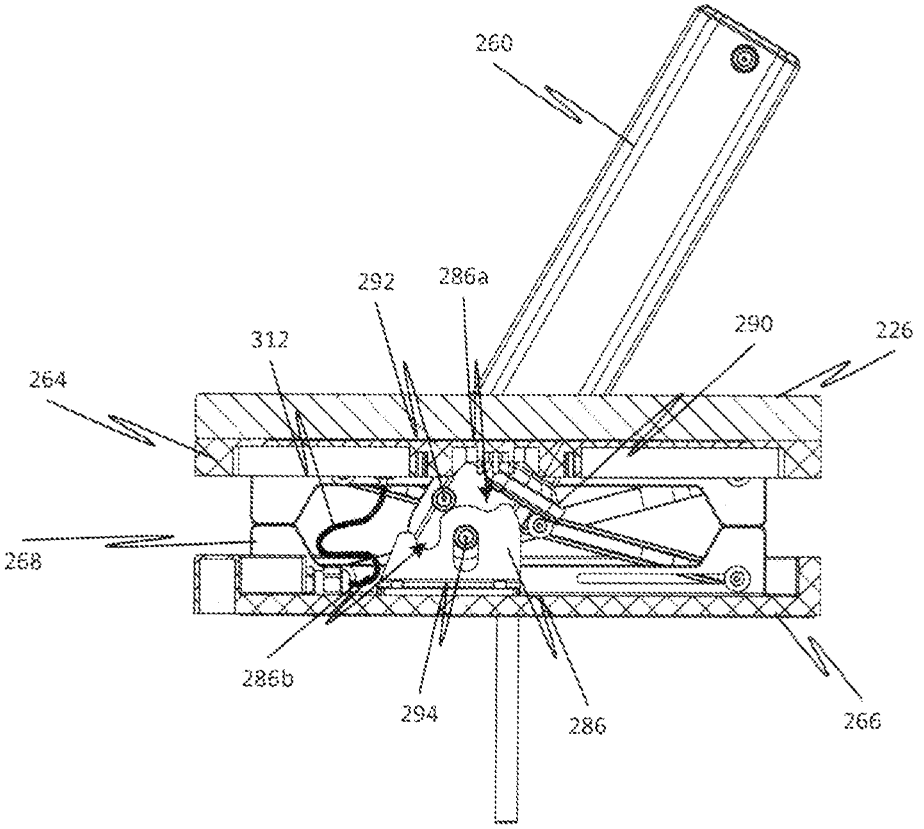
Figure 8A:
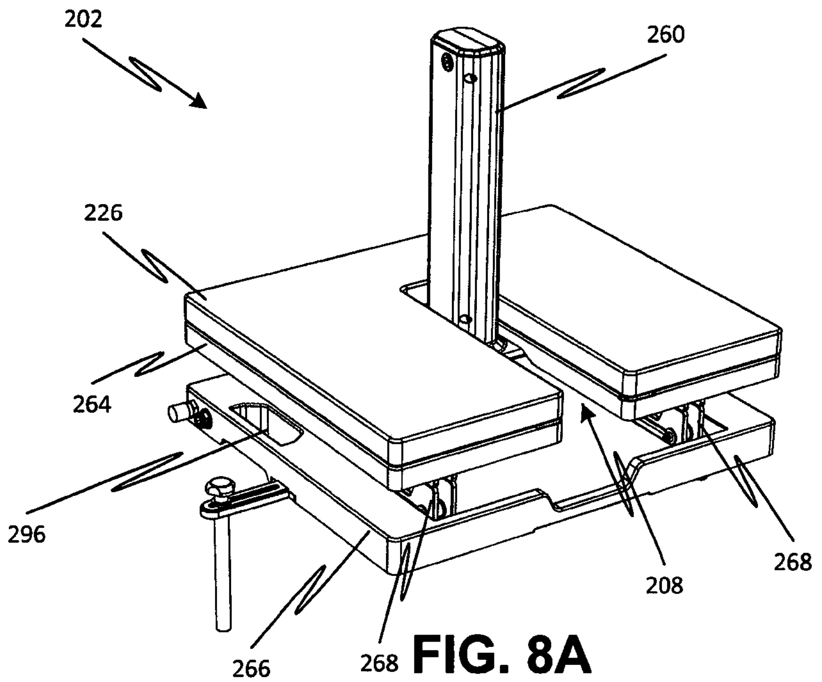
FIGS. 8A, 8B, and 8C are perspective, side cross-sectional, and side views, respectively, illustrating full rotation of the alignment post of the platform assembly to a final deployed position.
Figure 8B:
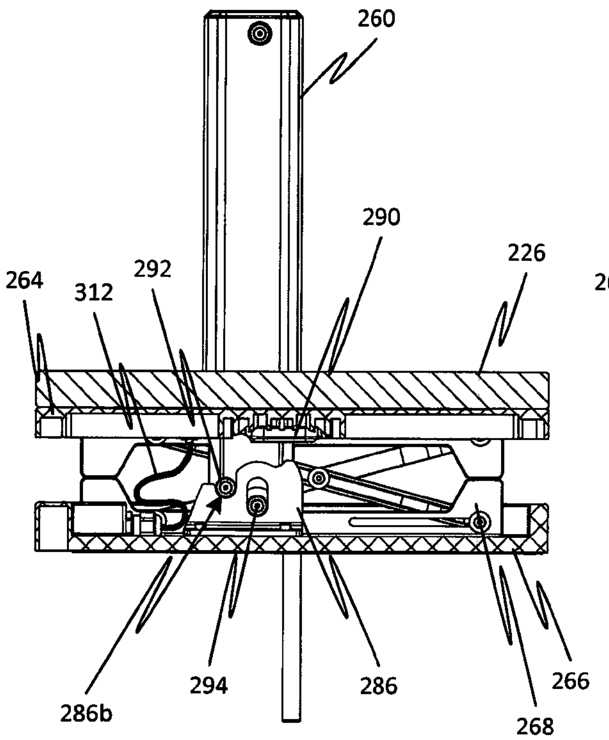
Figure 8C:
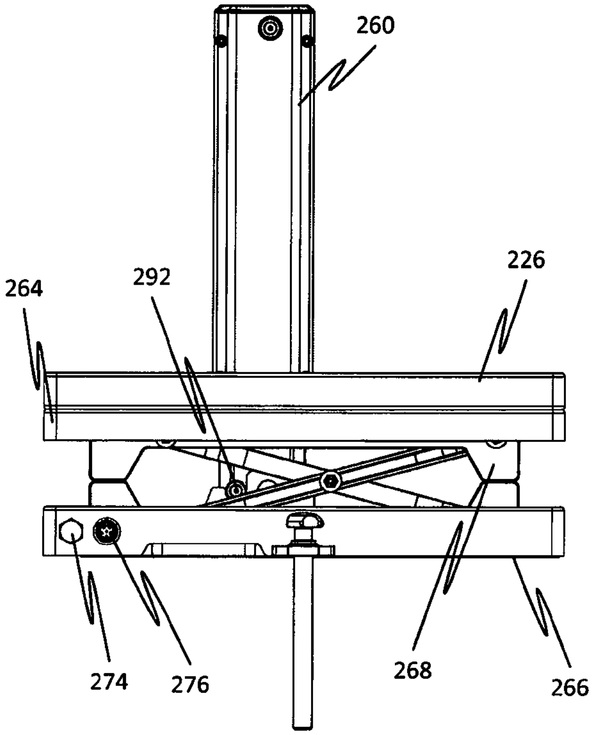

For example, as shown in FIG. 4C-4D, the alignment post 260 is rotatably coupled to the bottom plate 266 at pivot 288. Support brackets 286 are disposed on opposite lateral sides of the post 260, and pivot shaft 294 extends through the brackets 286 and the post 260 to hold the assembly together. Pivot heads 292 are also attached to the alignment post 260 and follow a contoured path defined by an upper surface of the brackets 286, which path passively defines urging or locking positions for the alignment post 260. For example, when the alignment post 260 is in the stowed position, pivot head 292 rests within recess 286*a*, which helps maintain the post 260 in said position, as shown in FIG. 5B. Sufficient force may be applied to the alignment post 260 such that pivot head 292 leaves recess 286*a*, as shown in FIG. 7B, after which the bracket path urges the pivot head 292 to recess 286*b*. With pivot head 292 resting within recess 286*b*, the alignment post 260 is in the fully deployed position, as shown in FIGS. 8A-8C. The alignment post 260 may include a longitudinally extending portion 290 that acts to further limit the rotation by abutting a portion of the top plate 264, as shown in FIG. 8B.

Figure 5A:
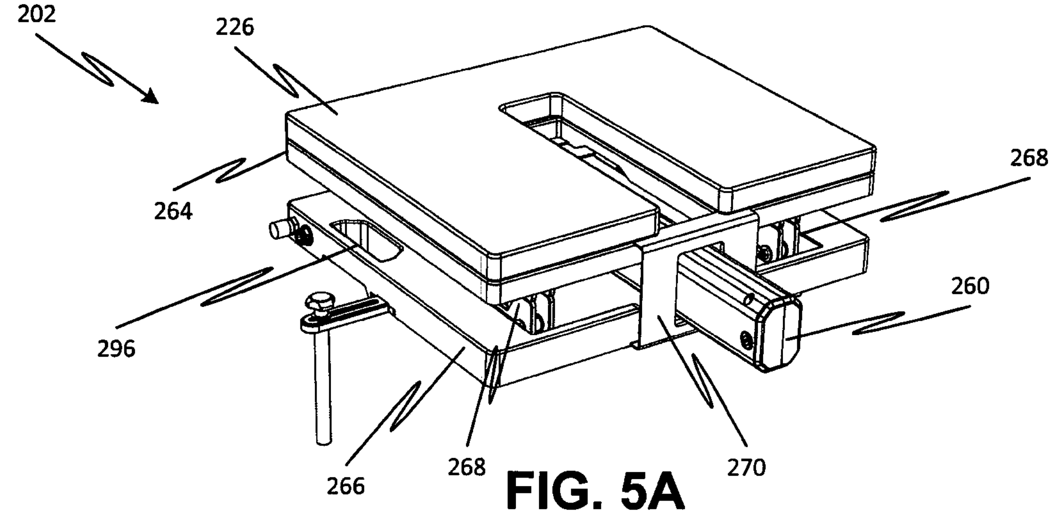
FIGS. 5A-5B are perspective and side cross-sectional views, respectively, of the platform assembly of the surgical positioning system with alignment post in an initial reclusive position.
Figure 5B:
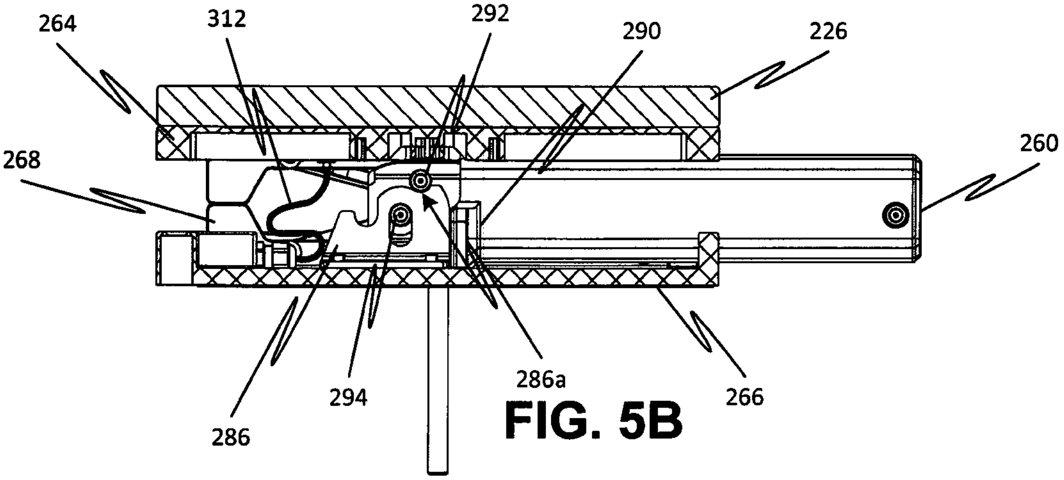
Figure 6:
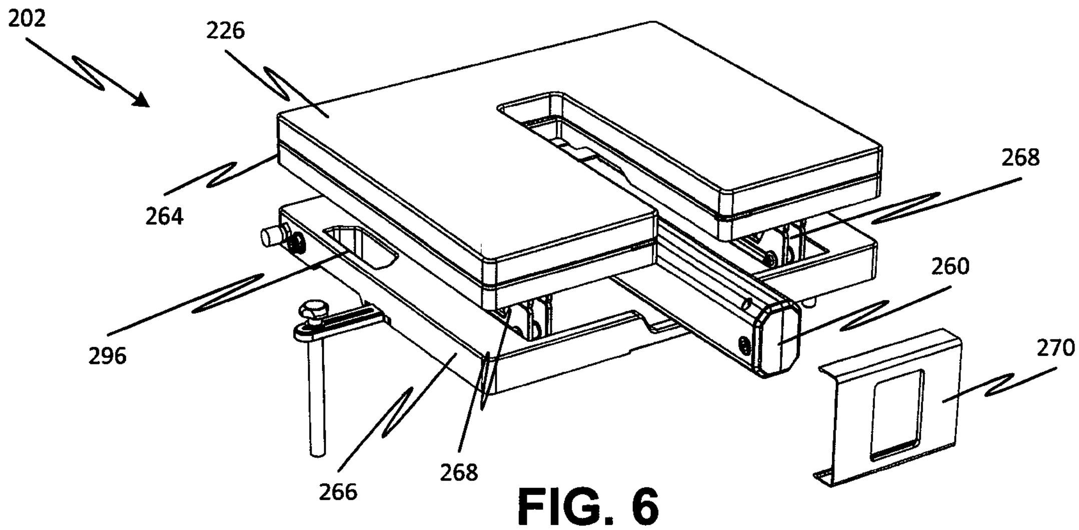
FIG. 6 is a perspective view of the platform assembly illustrating removal of a locking plate in preparation for rotation of the alignment post.

In some embodiments, a locking plate 270 may be disposed over the alignment post 260 in the stowed position and coupling together the top plate 264 and bottom plate 266, as shown in FIGS. 5A-5B. The locking plate 270 may be especially useful when transporting the platform assembly, as it restricts the alignment post and the top/bottom plates from inadvertent motion. The locking plate 270 can be removed in order to allow for elevation of the platform assembly 202 and/or actuation of the alignment post 260, for example, as shown in FIG. 6.

Figure 10A:
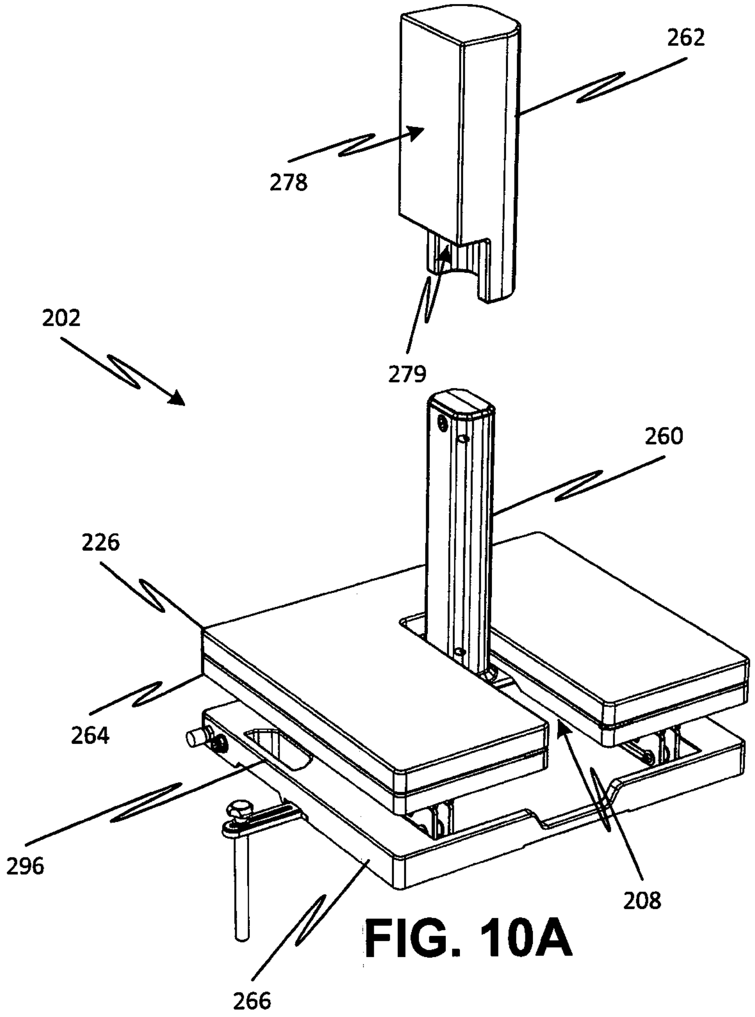
FIGS. 10A-10B are perspective views of the platform assembly of FIG. 4A-4C prior to and after installation, respectively, of a post padding on the deployed alignment post.
Figure 10B:
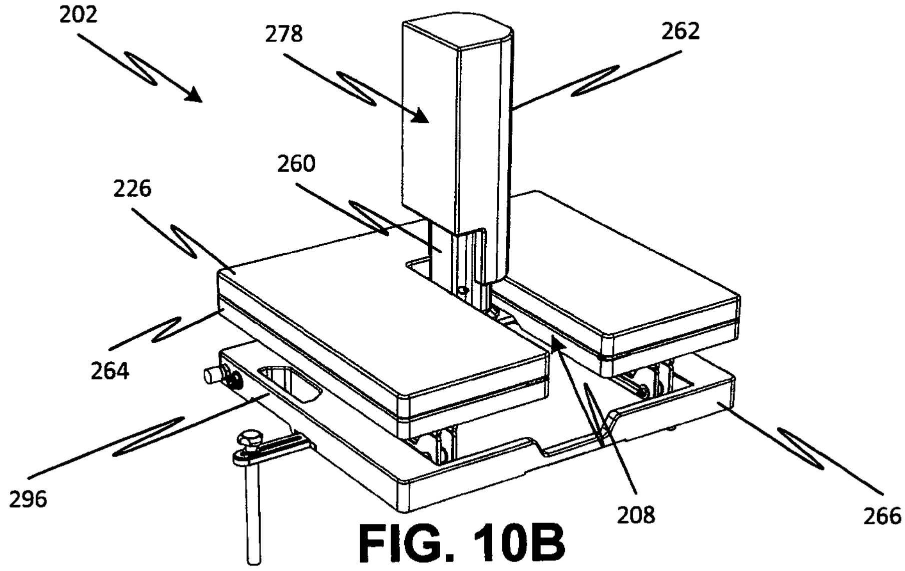

The alignment post 260 can further include padding 262 to cushion contact with adjacent portions of patient 320. The padding 262 may be symmetrical with respect to its central axis along the X-direction but asymmetrical with respect to its central axis along the Y-direction (laterally asymmetrical). Padding 262 can provide a rounded surface to contact a leg of the patient that is not being operated on, while the opposite surface 278 acts as a mounting surface for an inflatable positioning member 310. In some embodiments, the padding 262 is removable, for example, being disposed on the alignment post 260 only after the post 260 is in its fully deployed position. For example, the padding 262 can have a central cavity 279 sized and shaped to receive a free end of the alignment post 260, as shown in FIGS. 10A-10B. In other embodiments, the padding 262 may be capable of being installed on the alignment post 260 when the post 260 is in the stowed position, or the padding 262 may otherwise be an integral part of the alignment post 260.

Figure 9A:
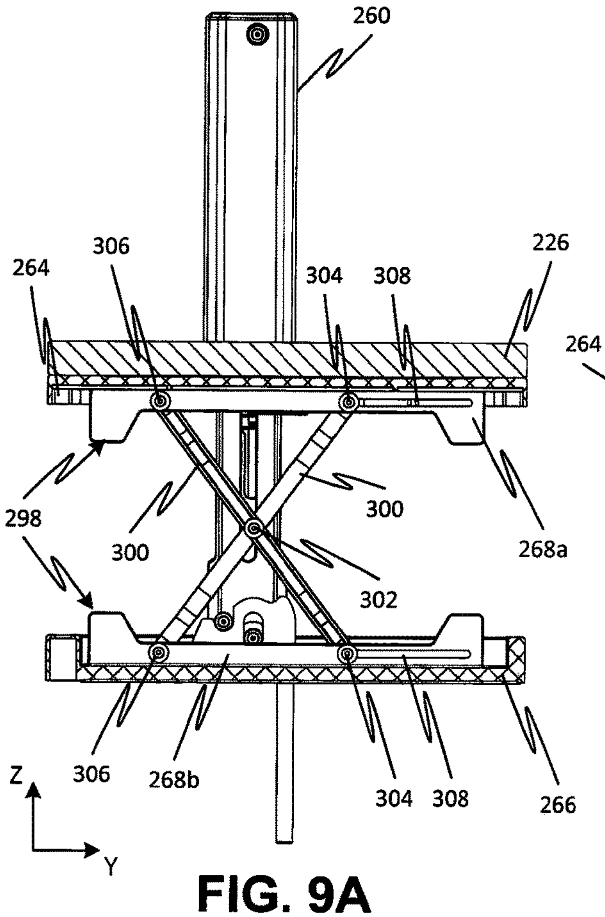
FIGS. 9A-9B are side cross-sectional and side views, respectively, illustrating elevation of the platform assembly of the surgical positioning system.
Figure 9B:
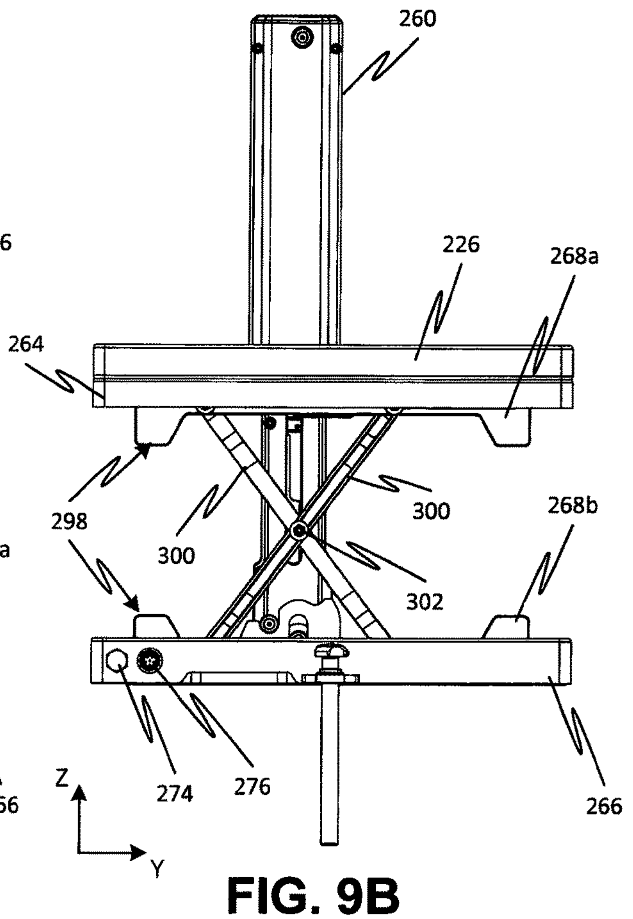

As best shown in FIGS. 9A-9B, the one or more elevation assemblies 268 are coupled to both the top plate 264 and bottom plate 266, and can be actuated to change a vertical distance between the plates 264, 266 (e.g., elevation of the supported portion of the patient along the Z-direction). For example, the elevation assembly 268 can be a scissor assembly with an upper section 268*a*, a lower section 268*b*, and a pair of arms 300. Each section 268*a*, 268*b* is rigidly connected to the respective platform plate 264, 266. The sections 268*a*, 268*b* also include vertically-protruding portions 298 that abut each other when the elevation assembly 268 is in an unextended state, so as to define a minimum height of the platform assembly 202. The pair of arms 300 are arranged in a crossing configuration and connected together at a central pivot 302. First ends 306 of the arms 300 are coupled to the respective section 268*a*, 268*b* by fixed pivots, while opposite second ends 304 are capable of moving longitudinally along slots 308 in the sections 268*a*,

268*b*. An actuator, such as a linear actuator, moves the second ends 304 in slots 308 along the longitudinal axis (Y-direction), while the crossing configuration of the arms 300 converts the linear motion of the second ends 304 into vertical motion (Z-direction) between the plates 264, 266. For example, the elevation assemblies 268 may provide elevation of up to 15 cm and a lifting capacity of up to 150 kg (331 lbs.).

In some embodiments, as shown in FIGS. 8A-9B, the alignment post 260 can maintain its height about the top plate 264 despite elevation of the top plate 264 with respect to the bottom plate 266. For example, the alignment post 260 can include a telescoping mechanism that allows an upper end of the post 260 to translate vertically as the top plate 264 is elevated with respect to the bottom plate 266. Constant positioning of the patient using the alignment post 260 can thus be achieved regardless of any changes in pelvic elevation.

Figure 4E:
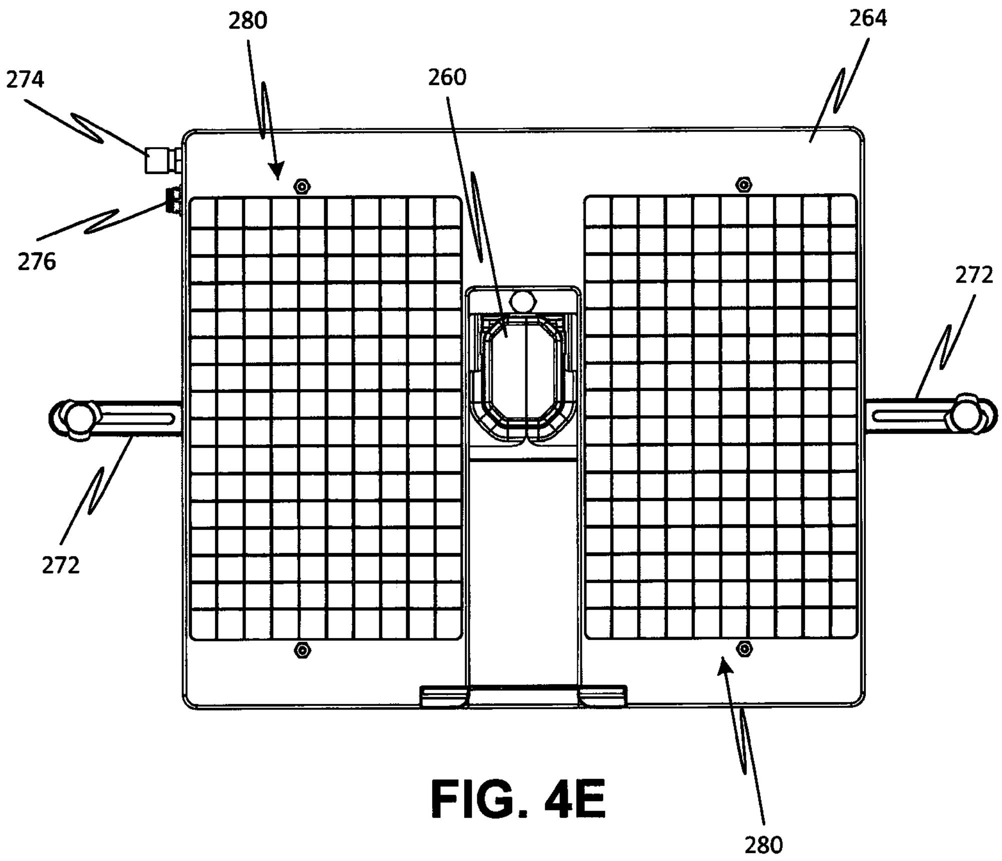
FIG. 4E is a top view of an imaging grid of the platform assembly of FIG. 4C.

In some embodiments, the platform assembly 202 can include one or more imaging alignment markers 280 (also known as a grid guidance template). For example, as illustrated in FIG. 4E, the imaging alignment markers can have a radiopaque grid pattern. In some embodiments, the markers 280 may be formed as decals mounted on an upper surface of the top plate 264 and underneath padding 226. In other embodiments, the markers 280 may be formed as an integral part of the top plate 264 or the padding 226. Other locations on the platform assembly and/or configurations for markers 280 are also possible according to one or more contemplated embodiments. The markers 280 can be used to check leg length and joint offset during surgery, for example, by using X-ray imaging of the patient anatomy and underlying markers 280. The use of image intensifiers in the X-ray imaging can allow for the check based on markers 280 to occur in substantially real-time.

The surgical positioning system 200 can further include a positioning member 310 (also known as a femoral delivery bladder), which is inflatable from a completely deflated state to a fully inflated state, as well as anywhere in between. The positioning member 310 can cradle a leg or buttock of the patient 320 thereon, with inflation of the member 310 causing elevation and lateralization of the femur during anterior-approach surgery. For example, the positioning member 310 can be a substantially L-shaped bladder, as best shown in FIGS. 11A-11D. The positioning member 310 can have a vertically extending inner surface 310*a* that contacts a side of the patient's leg/buttock and acts to lateralize the femur when the positioning member 310 is inflated. A horizontally-extending inner surface 310*b* contacts an underside of the patient's leg/buttock and acts to elevate the femur when the positioning member 310 is inflated. Opposite to surface 310*a* is vertically-extending surface 310*c*, which is coupled to facing surface 278 of the alignment post padding 262. For example, the positioning member surface 310*c* and the alignment post padding surface 278 can be releasably coupled together by any mechanical attachment means, such as, but not limited to, hook-and-loop fastener, permanent adhesive, reusable adhesive, latch, and/or locking clip. Alternatively or additionally, the positioning member and the alignment post can be releasably coupled together by magnetic attachment means, for example, via magnetic attraction between opposite poles of magnets in or on facing surfaces 278, 310*c* or between a magnet in or on one of the facing surfaces 278, 310*c* and a metal in or on the other of the facing surfaces 278, 310*c*. Opposite to surface 310*b* is horizontally-extending surface 310*d*, which rests on an upper surface of the platform padding 226. In some embodiments, the surface 310*b* may also be coupled to the platform padding 226, for example, by any mechanical or magnetic attachment means.

The positioning member 310 can be connected to a conduit 312 within the platform assembly 202. The conduit 312 can have a female pneumatic connector 314 at one end that interfaces with a corresponding male pneumatic connector 316 of the positioning member 310. The opposite end of conduit 312 is coupled to connector 274 on the bottom plate 266 of the platform assembly 202. Thus, positioning member 310 can be connected to the pneumatic source of the control unit 204 via the platform assembly 202. Alternatively, the pneumatic connection from control module 204 can directly connect to pneumatic connector 316 of the positioning member without connecting to connector 274 of the platform assembly 202.

In some embodiments, the positioning member 310 may be considered a part of platform assembly 202. For example, the positioning member 310 may be integrated with and inseparable from the alignment post 260 or the alignment post padding 262. In another example, the positioning member 310 may be separable from the alignment post 260 and/or the alignment post padding 262 (e.g., via a releasable attachment mechanism), but may nevertheless be considered as part of the overall platform assembly 202. In other embodiments, the positioning member 310 may be considered a separate part independent from the platform assembly 202.

Referring to FIGS. 12A-12E and FIG. 19, an exemplary method 600 for use of surgical positioning system during surgery on a patient 320 will be described. The method can initiate at process block 602, where the surgical operating table 210 is provided with the platform assembly 202 of surgical positioning system 200. For example, an existing pelvic support pad (e.g., cushion) of the surgical operating table 210 between torso support pad 222 and leg support pad 224 can be removed and replaced with platform assembly 202. Alternatively or additionally, the support pads 220-224 are part of the surgical positioning system, and process block 602 includes providing the support pads 220-224 on respective support panels 212-216 of the operating table as well as disposing platform assembly 202 between the torso support pad 222 and the leg support pad 224.

Figure 12A:
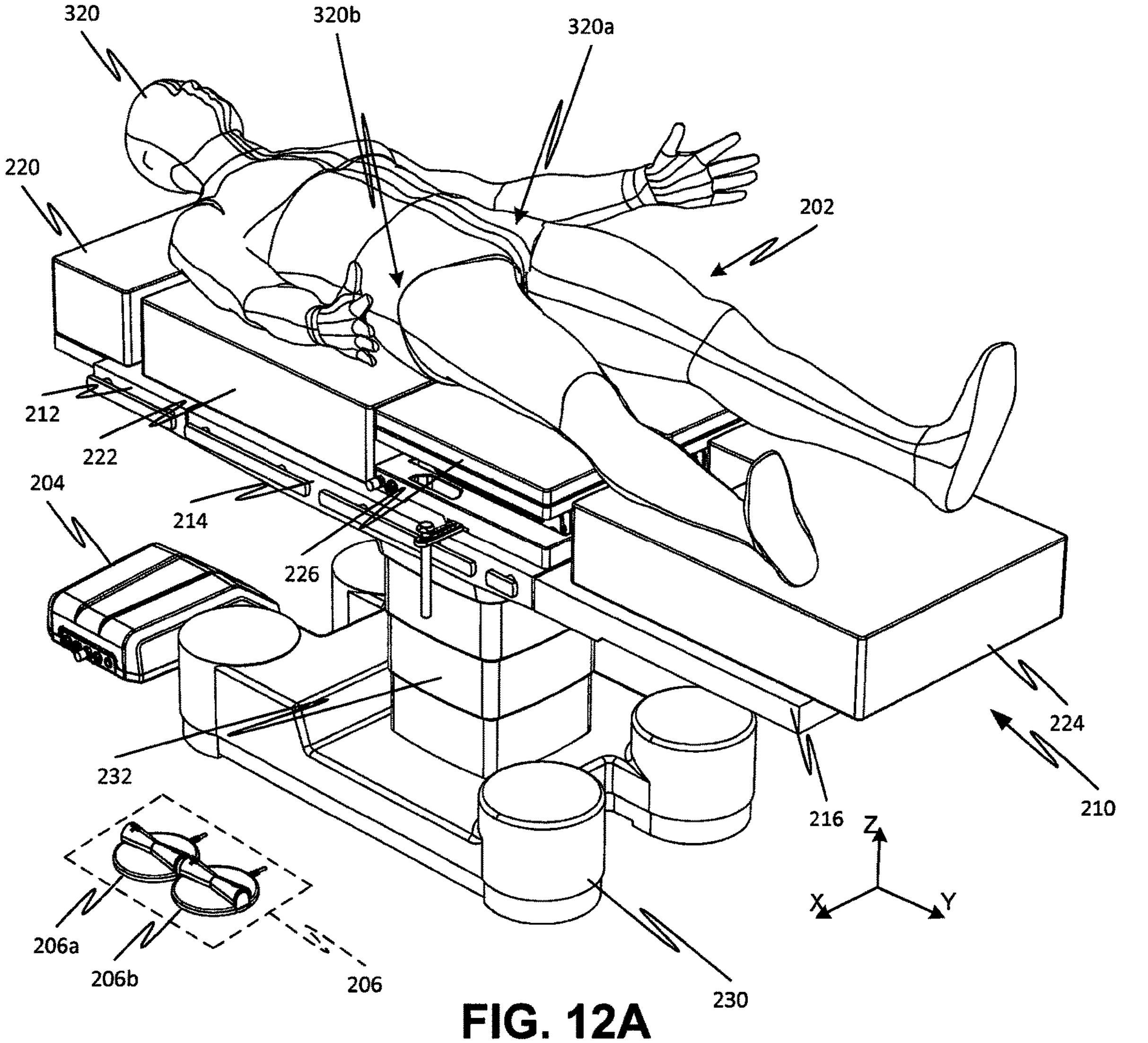
FIGS. 12A-12D are perspective views of the surgical operating table of FIG. 2 supporting a patient during various stages of operation of the surgical positioning system.
Figure 19:
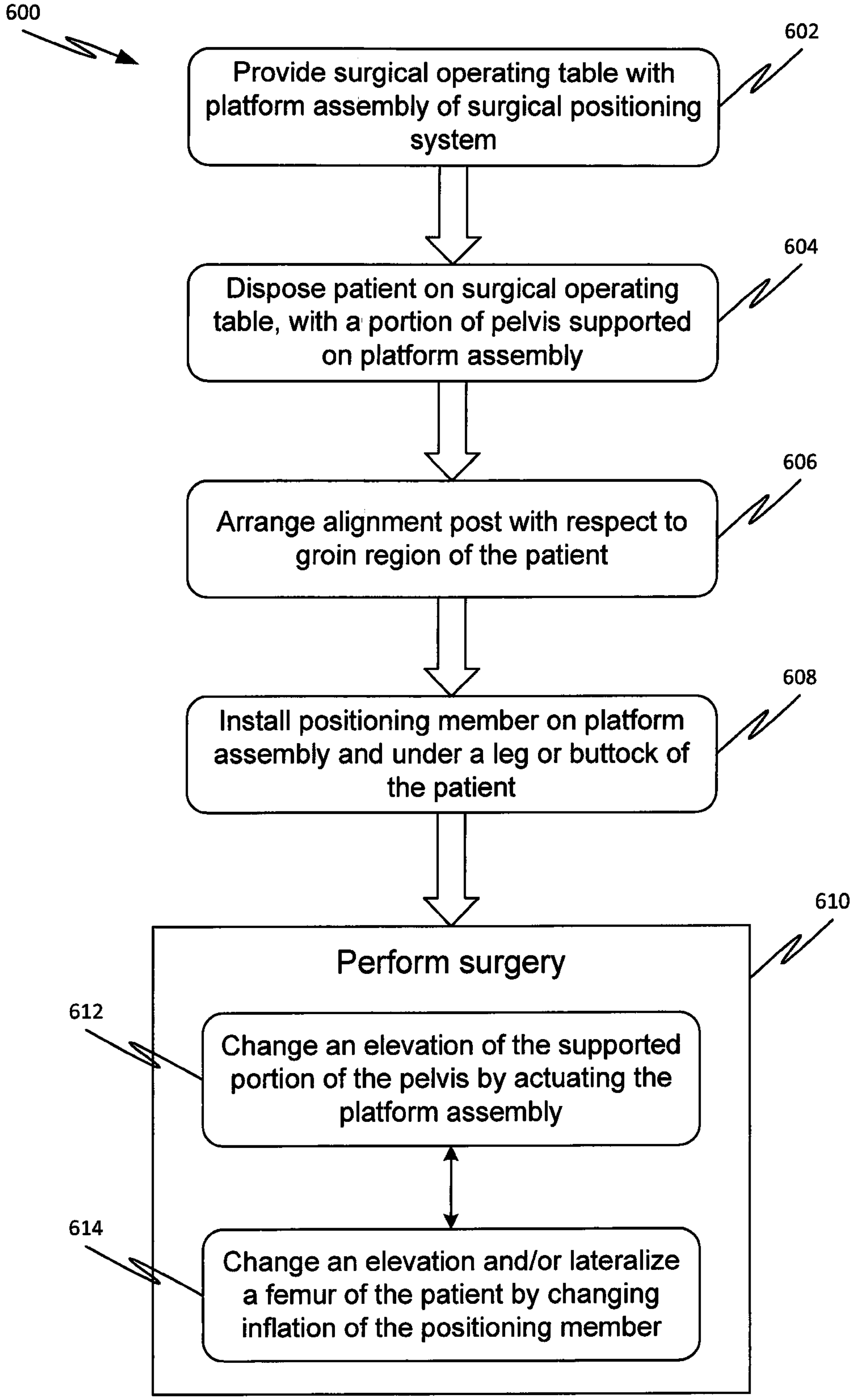
FIG. 19 is a process flow diagram of an exemplary method for use of a surgical positioning system, according to one or more embodiments of the disclosed subject matter.

In FIG. 19, the method 600 can proceed to process block 604, where the patient is disposed on the surgical operating table with at least a portion of the pelvis being supported on the platform assembly of the surgical positioning system. For example, as shown in FIG. 12A, patient 320 can be disposed face-up on operating table 210, with at least a portion of the pelvic region of the patient being on the support padding 226 of the top plate 264 of the platform assembly 202. The groin region 320*a* may be disposed adjacent to slot 208 of the platform assembly 202.

Figure 12B:
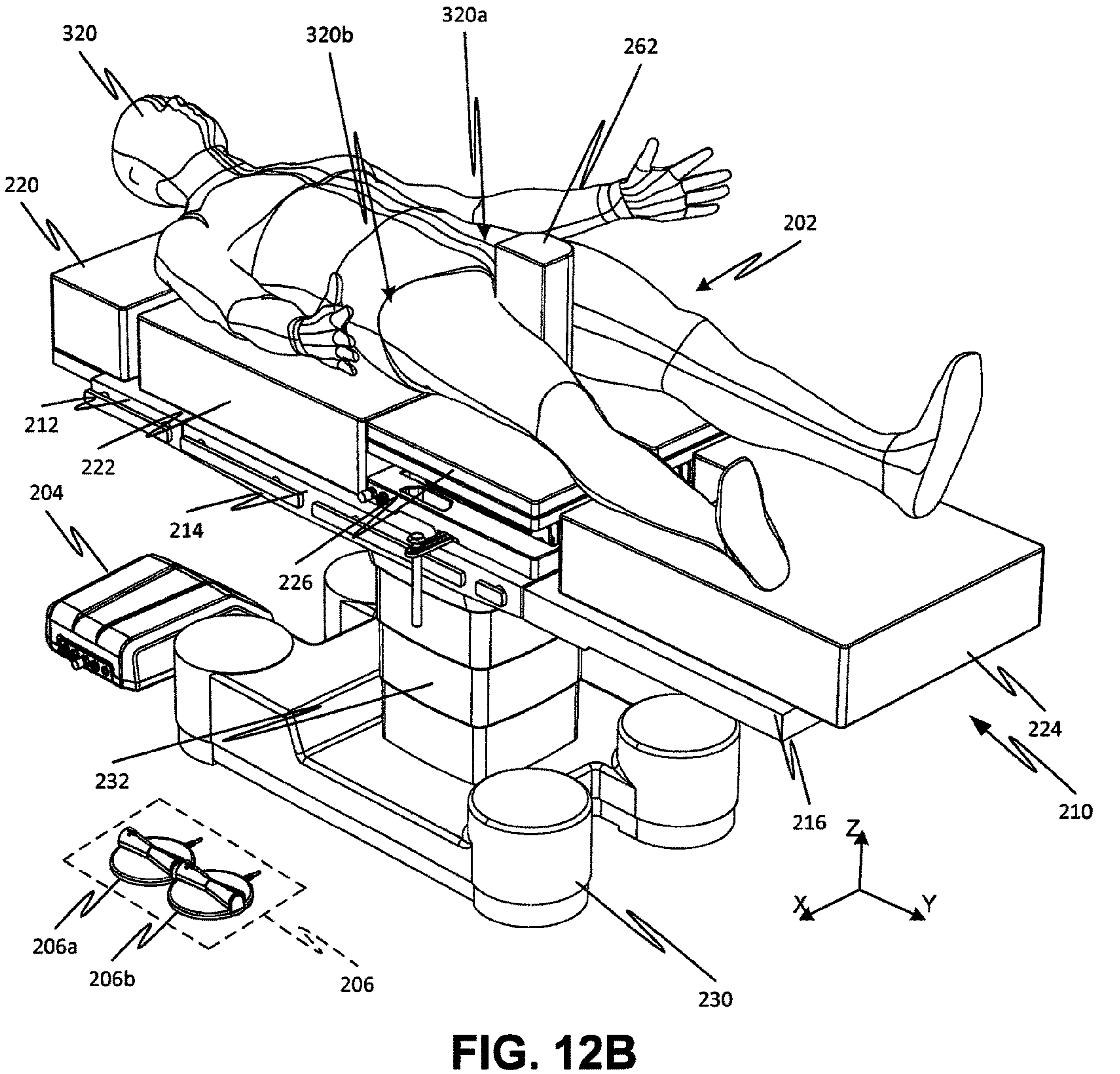

In FIG. 19, the method 600 can proceed to process block 606, where the alignment post is arranged with respect to a groin of the patient. For example, as shown in FIG. 12B, the alignment post 260 can be rotated (in the Y-Z plane) into the fully deployed position, and the padding 262 can be installed over the alignment post 260 such that the padding 262 abuts the groin region 320*a*. For example, the padding 262 can be arranged such that the positioning member mounting surface 278 faces a hip 320*b* on which surgery is to be performed as part of a hip replacement surgery.

Figure 12C:
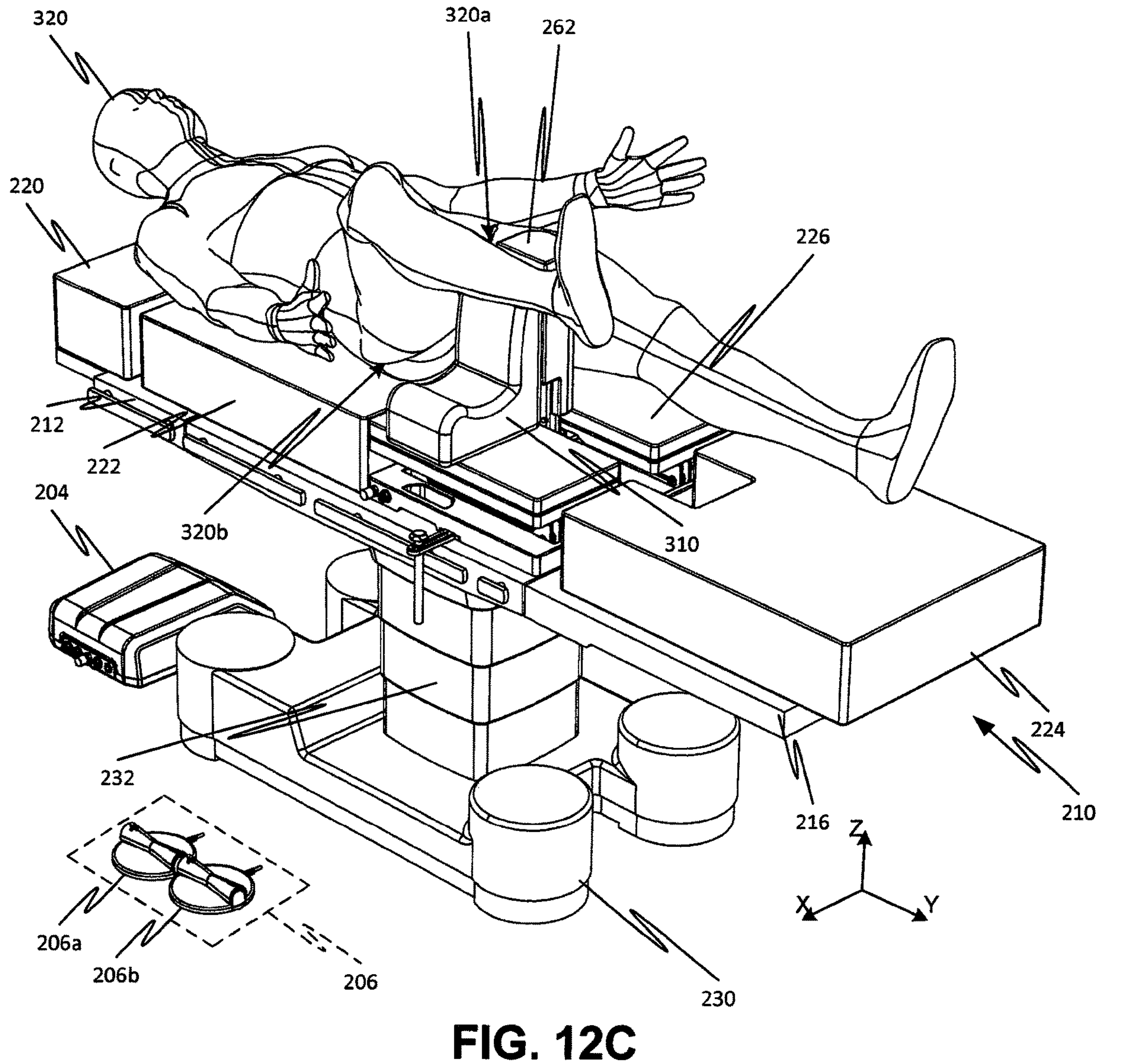

In FIG. 19, the method 600 can proceed to process block 608, where the positioning member is installed on the platform assembly and under a leg or buttock of the patient. For example, as shown in FIG. 12C, a positioning member

Figure 11A:
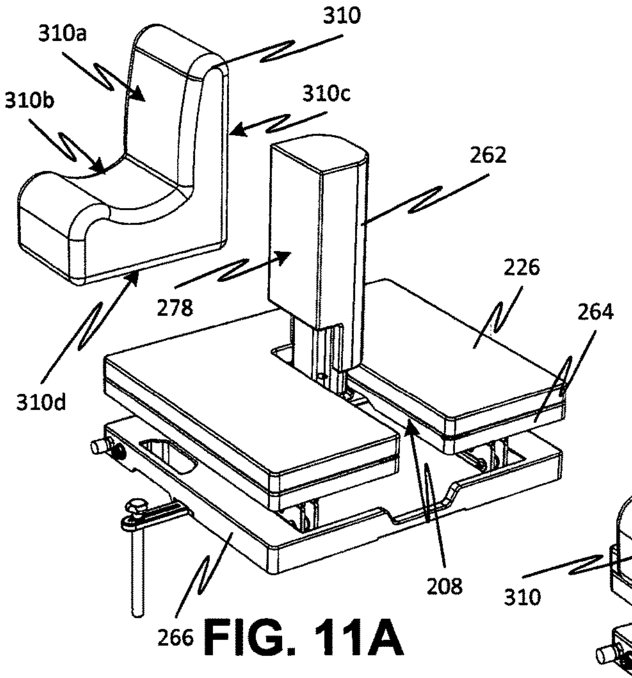
FIGS. 11A-11B are perspective views of the platform assembly of FIGS. 10A-10B prior to and after installation, respectively, of an inflatable positioning member on the deployed alignment post.
Figure 11B:
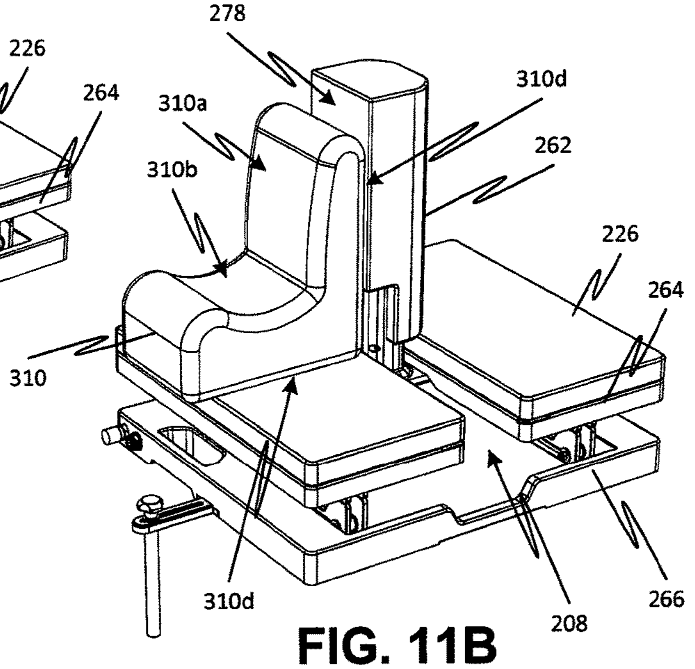
Figure 11C:
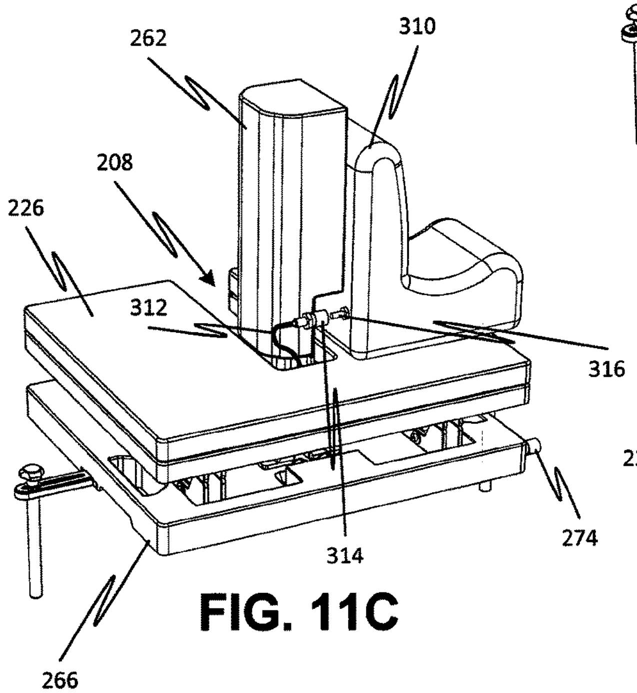
FIGS. 11C-11D are reverse perspective views of the platform assembly of FIGS. 10A-10B prior to and after connection, respectively, of the inflatable positioning member to a pneumatic conduit.
Figure 11D:
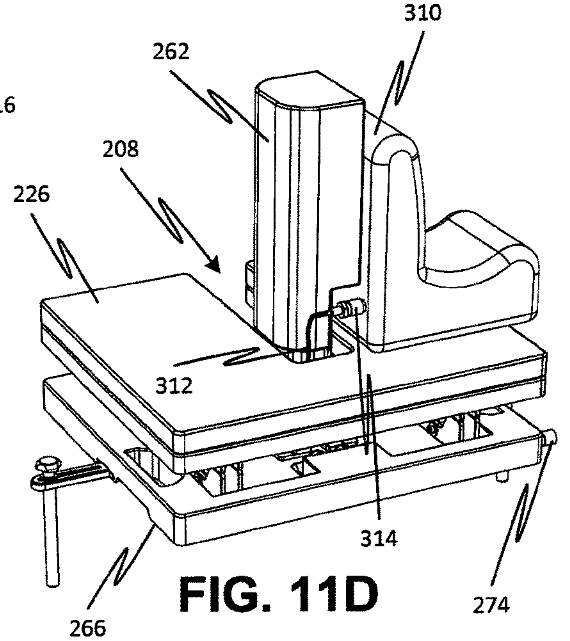
Figure 12D:
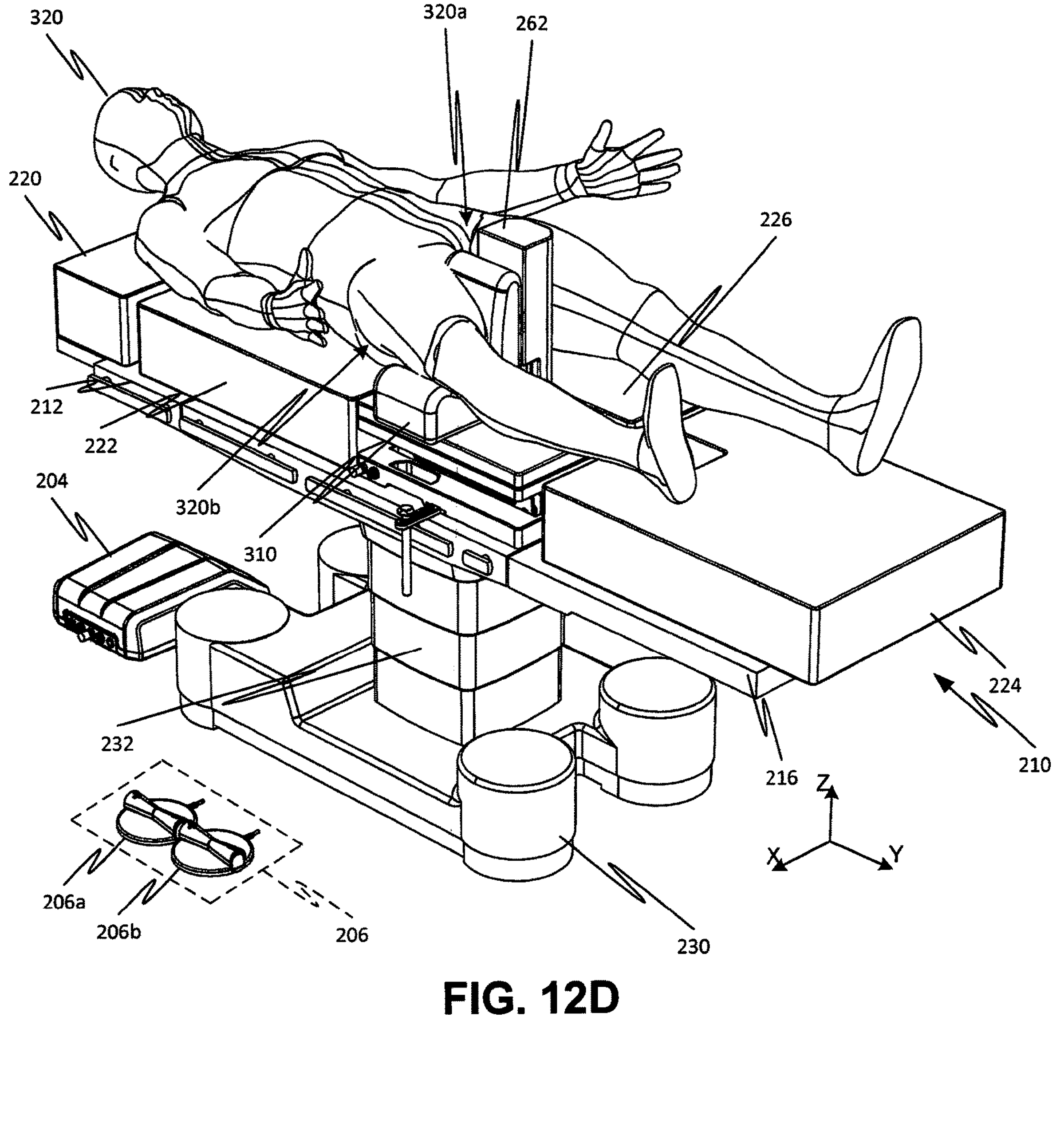

310 can be installed by temporarily raising the leg of the patient 320. The positioning member 310 can be installed by mounting surface 310*c* to the padding 262 (e.g., as shown in FIGS. 11A-11B) and attaching the pneumatic connector of the platform assembly 202 to the positioning member 310 (e.g., as shown in FIGS. 11C-11D). Once the positioning member 310 is installed, the leg or buttock of the patient is rested in the cradle formed by surfaces 310*a*-310*b* of positioning member, as shown in FIG. 12D. Although shown in FIGS. 11A-11D and 12C-12D in the fully inflated state, the positioning member will, in general, be initially installed in the fully deflated state. Inflation, whether fully or partially, may occur during particular stages of the surgical procedure, as required by the surgeon. Thus, at least initially, there may be no cradling or minimal cradling offered by the positioning member 310.

Figure 12E:
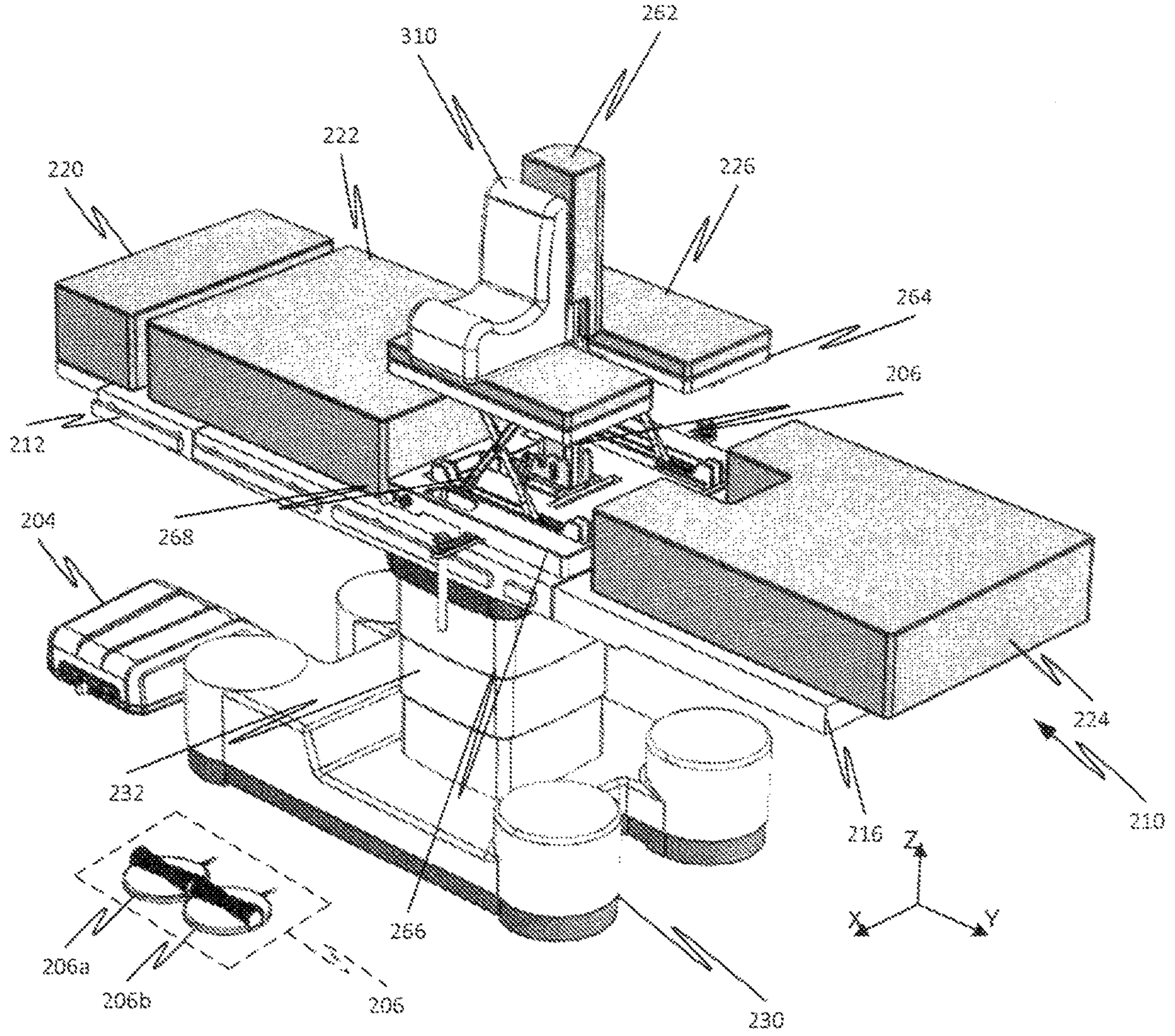
FIG. 12E is a perspective view of the surgical operating table of FIG. 2 during a pelvic elevation stage of operation of the surgical positioning system.

In FIG. 19, the method 600 can then proceed to process block 610, where a surgeon proceeds to perform surgery on the patient, for example, a hip replacement surgery. During surgery 610, the surgeon or other user may control the surgical positioning to effect desired position changes in the patient hip region. For example, surgery 610 can include process block 612, where an elevation of the supported portion of the patient's pelvis is changed by actuating the platform assembly, and process block 614, where a femur of the patient is elevated and/or lateralized by changing inflation of the positioning member. Process blocks 612-614 may be performed multiple times during surgery 610 and in any order. For example, the platform assembly 202 can be actuated to elevate the supported pelvis of the patient 320, as shown in FIG. 12E. In particular, the pelvic elevation offered by the platform assembly 202 can allow for extension of the hip 320*b*, thereby providing better exposure of the joint and bones. During another stage of surgery 610, with or without elevation by the platform assembly 202, the positioning member 310 can be inflated. For example, the positioning member 310 can be inflated for femoral stem preparation and insertion, which inflation may elevate and lateralize the proximal femur for ease of broaching. The positioning member 310 can otherwise be deflated during the acetabular preparation and insertion stages.

Referring now to FIGS. 13-18C, another exemplary surgical positioning system 400 is shown. The surgical positioning system 400 includes a platform assembly 402 (also known as a pelvic elevation platform), a control unit or module 404 (also known as a control box), and an input unit 206 (e.g., left foot pedal 206*a* and right foot pedal 206*b*, also known as a foot pedal system). Although not shown in the figures for clarity of illustration, the control module 404 is operatively connected to the platform assembly 402 by power supply conduits (e.g., electrical, hydraulic, and/or pneumatic) and to the input unit 206 by respective signal lines (e.g., electrical, hydraulic, and/or pneumatic). A surgeon operating on a patient 320 disposed on surgical operating table 210 can thus interact with the input unit 206 to directly control positioning of the patient by the platform assembly 402.

Figure 13:
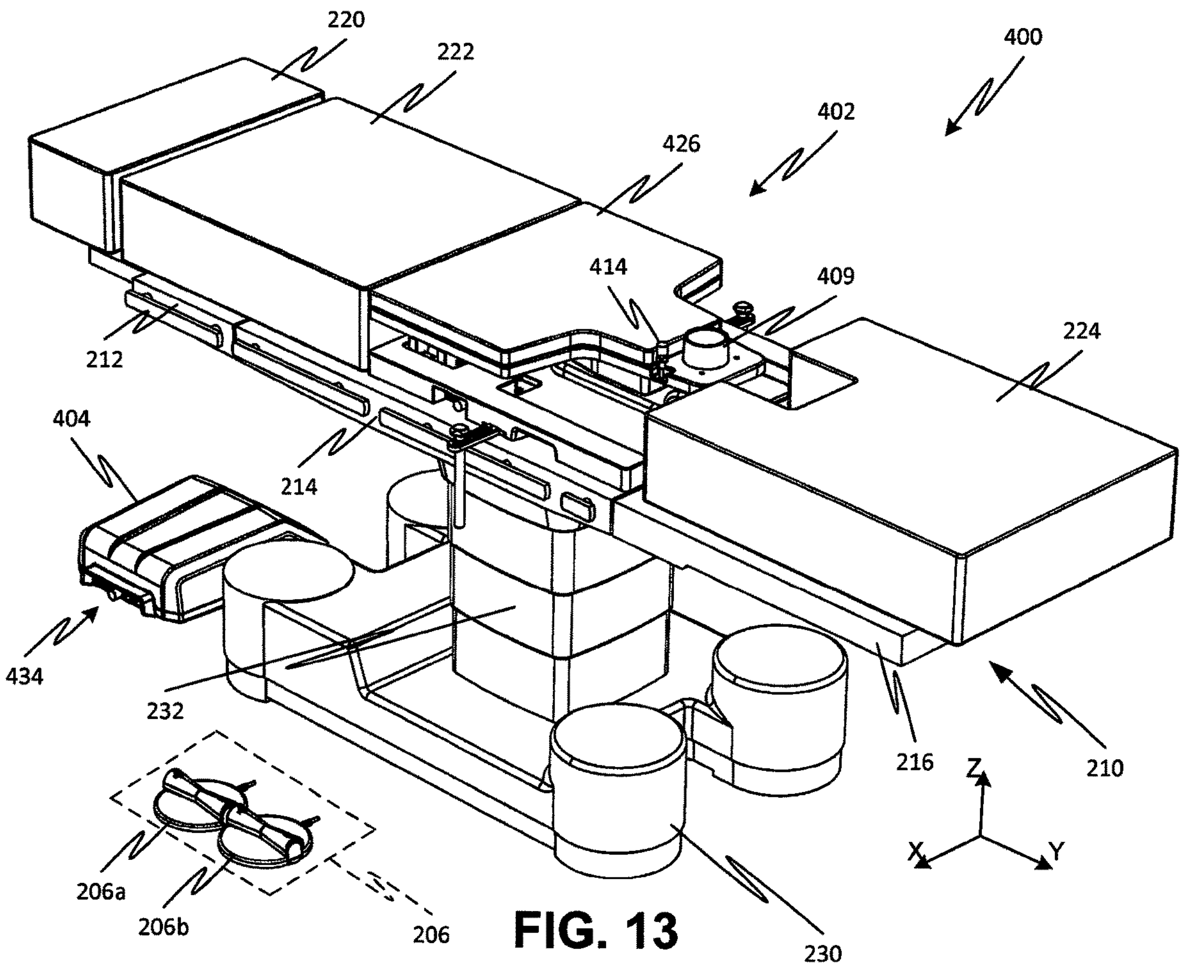
FIG. 13 is a perspective view of a surgical operating table employing a second example of a surgical positioning system, according to one or more embodiments of the disclosed subject matter.
Figure 14:
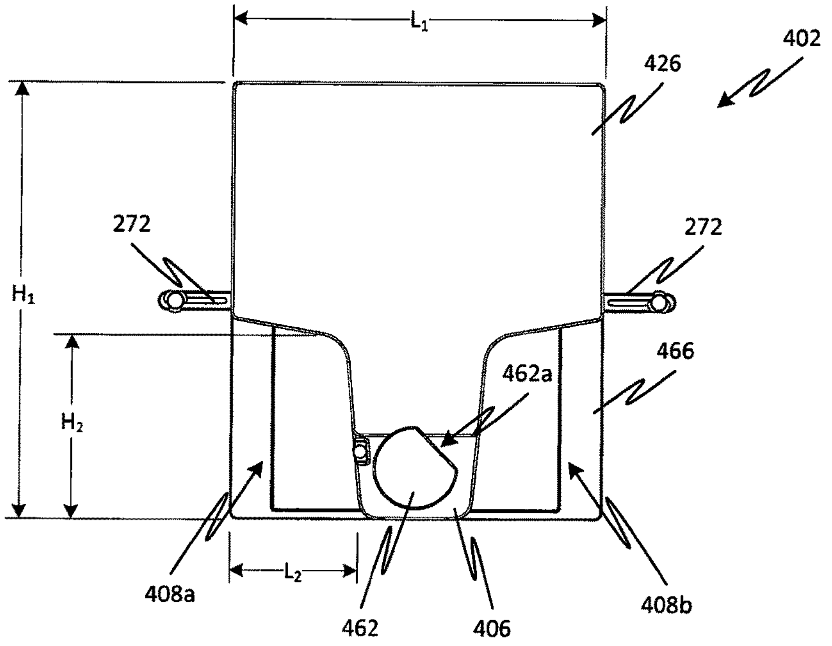
FIG. 14 is a top view of an exemplary platform assembly of the second example of a surgical positioning system, according to one or more embodiments of the disclosed subject matter.

In the illustrated example of FIG. 13, the platform assembly 402 is disposed on surgical operating table 210, which may have a configuration similar to the surgical operating table described with respect to FIG. 2 above. Each of the support panels 212, 214, 216 of the surgical operating table 210 can have respective support pads 220, 222, 224 (e.g., cushions) thereon. In some embodiments, the support pads 220-224 are part of the surgical positioning system 400 and are installed together with the platform assembly 402. In other embodiments, the support pads 220-224 are part of the operating table 210. The platform assembly 402 can thus be disposed on the torso support panel 214 of the operating table 210, between the torso support pad 222 and the leg support pad 224 along the longitudinal direction (e.g., along the Y-direction), so as to support a pelvic region of the patient 320 thereon. In some embodiments, a height (e.g., along the Z-direction) of the platform assembly 402 in the initial, non-extended position may be substantially equal to that of adjacent portions of the torso support pad 222 and the leg support pad 224.

As shown in FIG. 13, the control module 404 can be disposed on the floor underneath a portion of the operating table 210 and oriented to allow convenient routing of wiring and conduits to respective connectors of the input unit 206 and/or the platform assembly 402. In particular, the control module 404 can have an input/output (I/O) connector panel 434 that faces toward a side of the operating table 210 where the input unit 206 is disposed and/or where connectors 474, 476 (see FIGS. 17A-17C) of the platform assembly 402 are disposed. Similar to the control module 204 described above, the I/O connector panel 434 of control module 404 can have electrical connectors that respectively connect to foot control pedals 206*a*, 206*b*, a pneumatic connector that connects to pneumatic connector 474 of platform assembly 402, and another electrical connector that connects to electrical connector 476 of platform assembly 402. Control module 404 may thus have a construction and arrangement of components similar to that illustrated in FIGS. 3A-3D and described above with respect to control module 204.

Referring to FIGS. 14, 15A-15B, and 17A-17C, the platform assembly 402 can have a bottom plate 466 (also known as a base plate), a top plate 464, one or more elevation assemblies, and an alignment post 460 (also known as a dynamic peritoneal post). Alternatively, in some embodiments, the alignment post 460 can be considered a separate component that is coupled to the platform assembly 402. The bottom plate 466 is supported on the support panel of the surgical operating table and attached thereto by one or more mounting rails 272. The bottom plate 466 can also include connections to the control module 404, such as pneumatic connector 474 and electrical connection 476. Handles can be formed in the bottom plate 466, for example, as recessed portions on a bottom or side surfaces of the bottom plate 466, so as to allow for hand carrying and/or positioning of the platform assembly 402. Similar to bottom plate 266 described above, bottom plate 466 can have one or more feet (e.g., rubberized feet) that rest on a surface of the operating table 210.

The top plate 464 can have support padding 426 (e.g., cushion) over an upper surface thereof, which padding 426 supports the pelvic region of the patient 320 thereon. In contrast to the configuration described above with respect to FIGS. 2-13, the top plate 464 of platform assembly 402 includes a centrally-located (with respect to lateral X-direction) peninsular portion 406 that projects along the longitudinal direction (e.g., Y-direction) toward the feet of the patient 320. The peninsular portion 406 can be arranged between legs of the patient when portions of the legs and/or buttocks of the patient are otherwise supported on padding 426. The peninsular portion 406 can be defined by open regions 408*a*, 408*b* on opposite sides (with respect to lateral X-direction) of the peninsular portion 406. For example, along the longitudinal direction, a length ($H_2$) of the peninsular portion 406 may be about 248.5 mm compared to an overall length ($H_1$) for the platform assembly of about 587.25 mm. For example, along the lateral direction, a length ($L_2$) of each open region 408*a*, 408*b* may be about 172.2 mm compared to an overall length ($L_1$) of the platform assembly of about 500 mm.

An end portion of the peninsular portion 406 closest to the feet of the patient 320 may be exposed from the support padding 426 and can have a post bracket or mount 409. An end 460*a* of the alignment post 460 can be inserted into a corresponding opening 409*a* of the post mount 409 for use during surgery, and the alignment post 460 can be removed from the post mount 409 when otherwise not needed (e.g., for initial positioning of the patient on the surgical operating table, for removal of the patient from the surgical operating table, and/or for transport of the surgical positioning system between operating theaters and/or different operating tables). When inserted into the post mount 409, the alignment post 460 extends in direction away from bottom plate 466 and above top plate 464. The alignment post 460 can also move with the top plate 464 by virtue of being inserted into post mount 409, thereby maintaining a height of the alignment post 460 about the top plate 464 despite elevation of the top plate 464 with respect to the bottom plate 466.

Figure 15A:
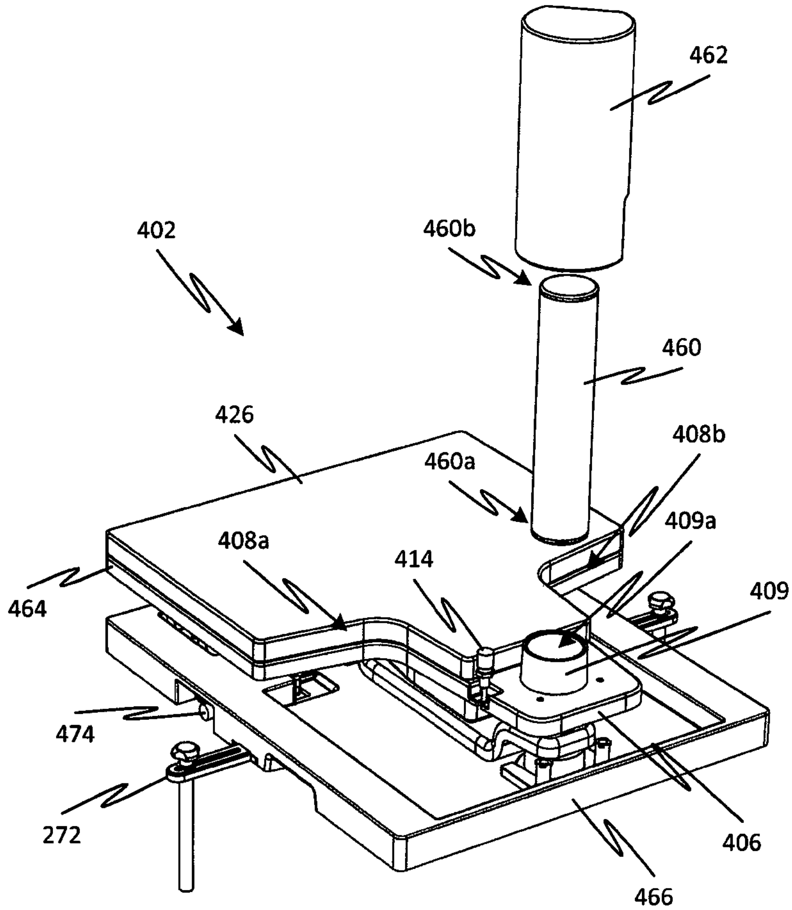
FIGS. 15A-15B are perspective views of the platform assembly of FIG. 14 prior to and after installation, respectively, of a post padding on the deployed alignment post.
Figure 15B:
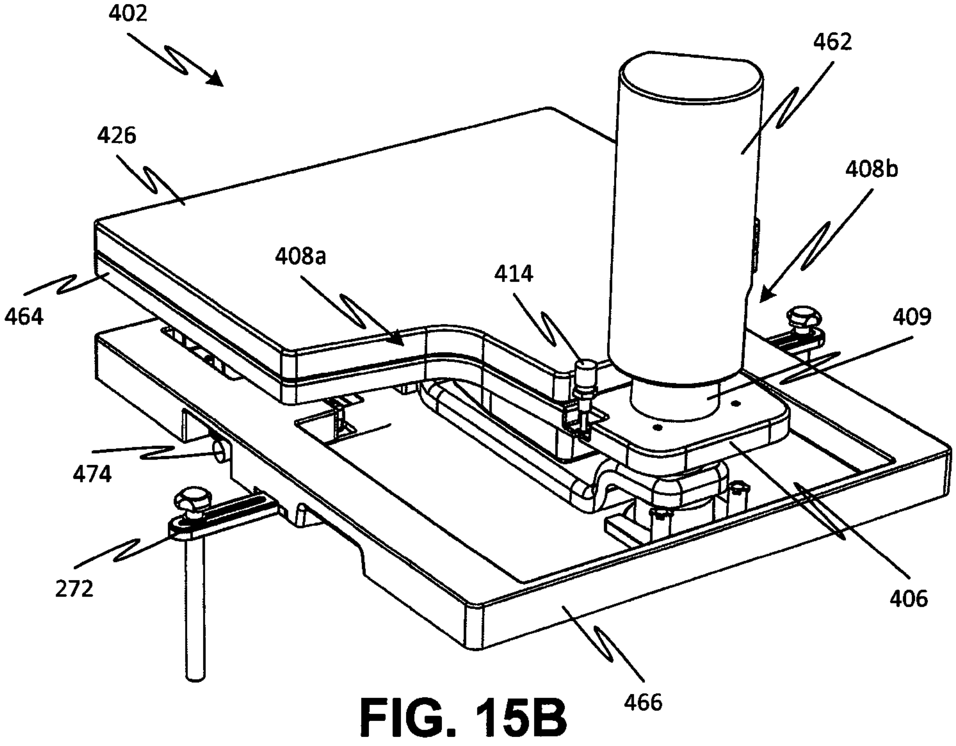

The alignment post 460 can further include padding 462 to cushion contact with adjacent portions of patient 320. The padding 462 can provide a rounded surface to contact a leg of the patient that is not being operated on, while the opposite surface 462*a* (FIG. 14) acts as a mounting surface for an inflatable positioning member 310. In some embodiments, the padding 462 is removable, for example, being disposed on the alignment post 460 prior to, during, or after insertion of end 460*a* into post mount 409. For example, the padding 462 can have a central cavity sized and shaped to receive a free end 460*b* of the alignment post 460, as shown in FIGS. 15A-15B. In other embodiments, the padding 462 may otherwise be an integral part of the alignment post 460.

The surgical positioning system 400 can further include a positioning member 310 (also known as a femoral delivery bladder), which may have a configuration similar to the positioning member described with respect to FIGS. 11A-11D. Thus, vertically-extending surface 310*c* can be coupled to facing surface 462*a* of the alignment post padding 462. For example, the positioning member surface 310*c* and the alignment post padding surface 462*a* can be releasably coupled together by any mechanical attachment means or magnetic attachment means, for example, as described above with respect to FIGS. 11A-11D.

Figure 16A:
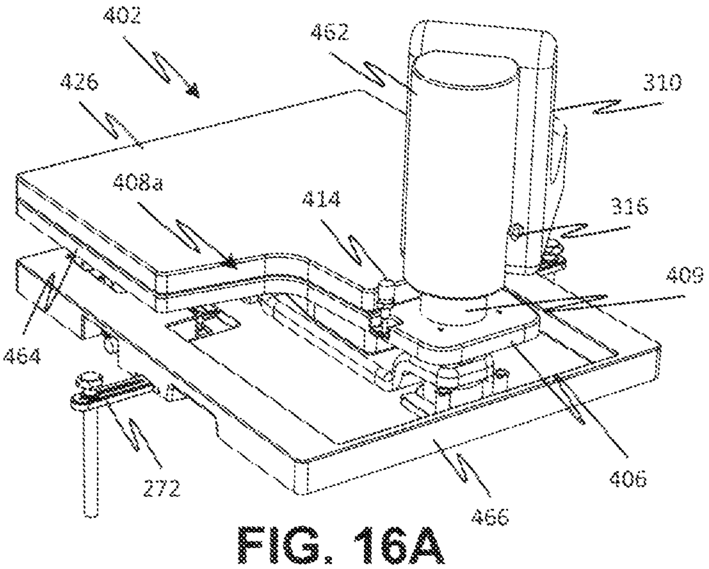
FIGS. 16A-16B are reverse perspective views of the platform assembly of FIGS. 15A-15B prior to and after connection, respectively, of the inflatable positioning member to a pneumatic conduit.
Figure 16B:
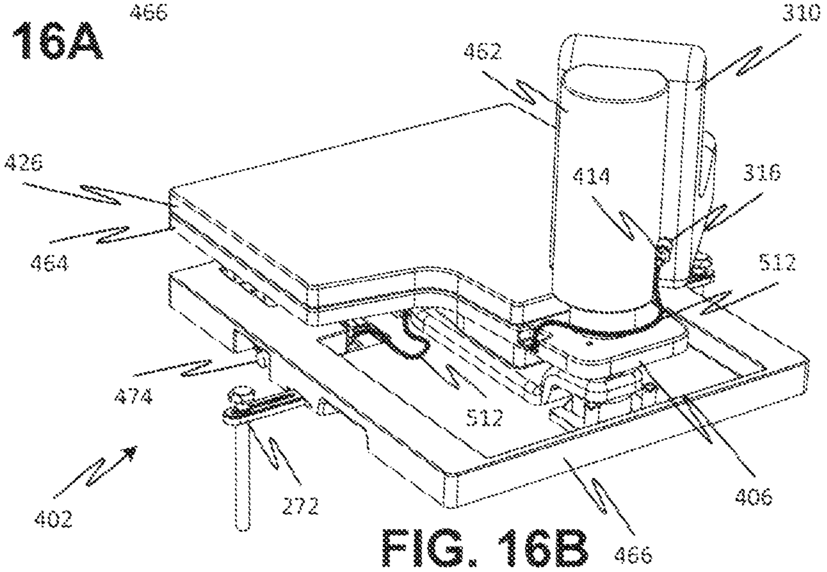
Figure 16C:
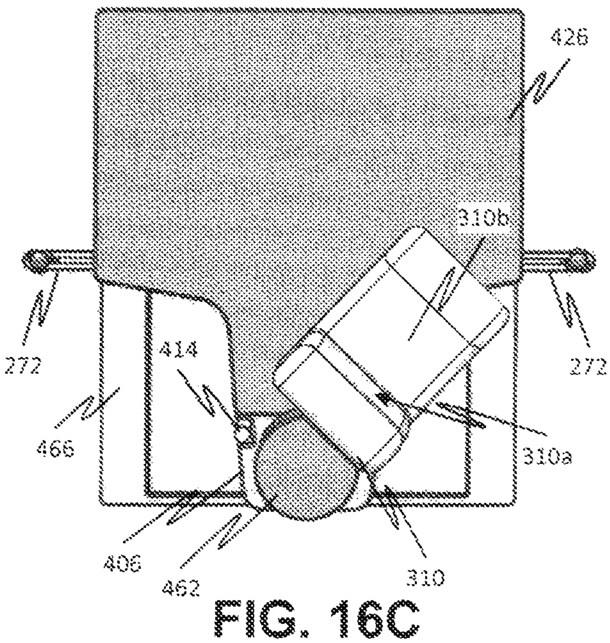
FIG. 16C is a top view of the platform assembly of FIG. 16A.

Referring to FIGS. 16A-16C, the positioning member 310 can be connected to a conduit 512 within the platform assembly 402. The conduit 512 can have a female pneumatic connector 414 at one end that interfaces with a corresponding male pneumatic connector 316 of the positioning member 310. The opposite end of conduit 512 is coupled to connector 474 on the bottom plate 466 of the platform assembly 402. Thus, positioning member 310 can be connected to the pneumatic source of the control unit 404 via the platform assembly 402. Alternatively, the pneumatic connection from control module 404 can directly connect to pneumatic connector 316 of the positioning member without connecting to connector 474 of the platform assembly 402. Prior to connection, the female pneumatic connector 414 can be stored in a recess in the peninsular portion 406 of the top plate 464, as illustrated in FIGS. 16A and 16C. The connector 414 can be pulled from the recess in the peninsular portion 406 and coupled to corresponding connector 316 of the positioning member, as shown in FIG. 16B. The conduit 512 may have sufficient slack between connector 474 and connector 414 to accommodate the movement of connector 414 from the peninsular portion recess to the positioning member 310. Alternatively or additionally, the conduit 512 may have sufficient flexibility to stretch in order to accommodate the movement of connector 414 from the peninsular portion recess to the positioning member 310.

In some embodiments, the positioning member 310 may be considered a part of platform assembly 402. For example, the positioning member may be integrated with and inseparable from the alignment post 460 or the alignment post padding 462. In another example, the positioning member 310 may be separable from the alignment post 460 and/or the alignment post padding 462 (e.g., via a releasable attachment mechanism), but may nevertheless be considered as part of the overall platform assembly 402. In other embodiments, the positioning member 310 may be considered a separate part independent from the platform assembly 402. For example, in some embodiments, positioning member 310 and/or alignment post padding 462 may be considered as a consumable or disposable component replaced for each patient or surgery, while other components of the surgical positioning system may otherwise be subject to sterilization for reuse.

Figure 17A:
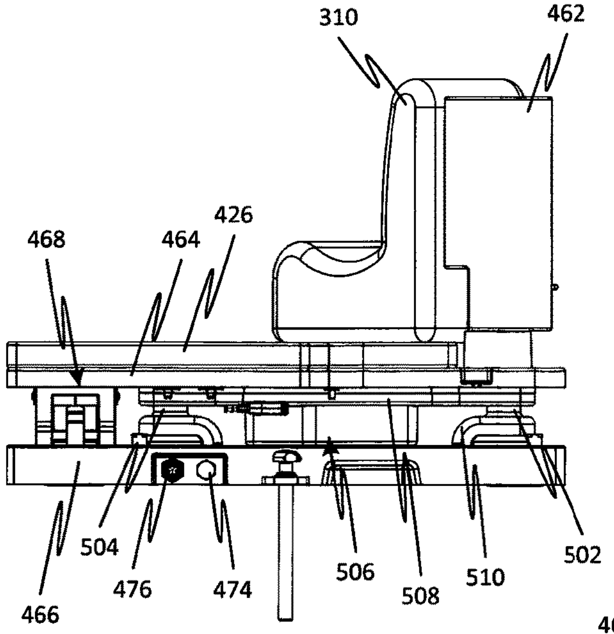
FIGS. 17A-17B are side views illustrating the platform assembly of FIG. 16B prior to and after elevation, respectively.
Figure 17B:
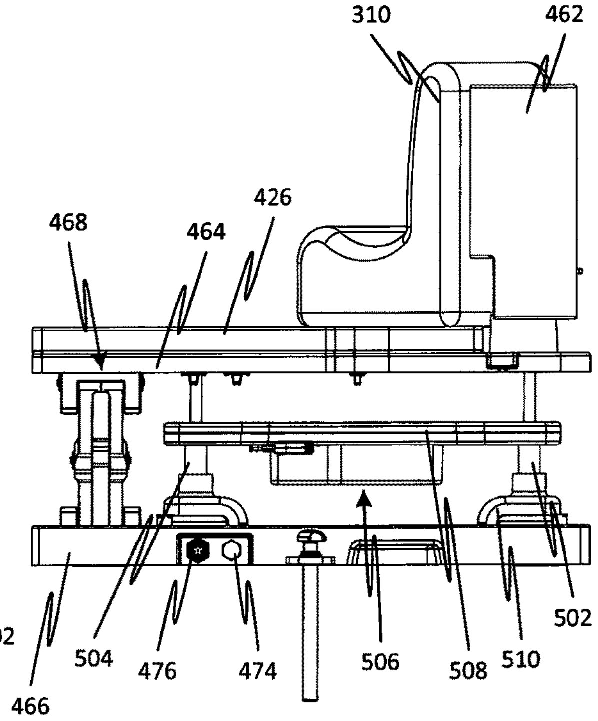
Figure 17C:
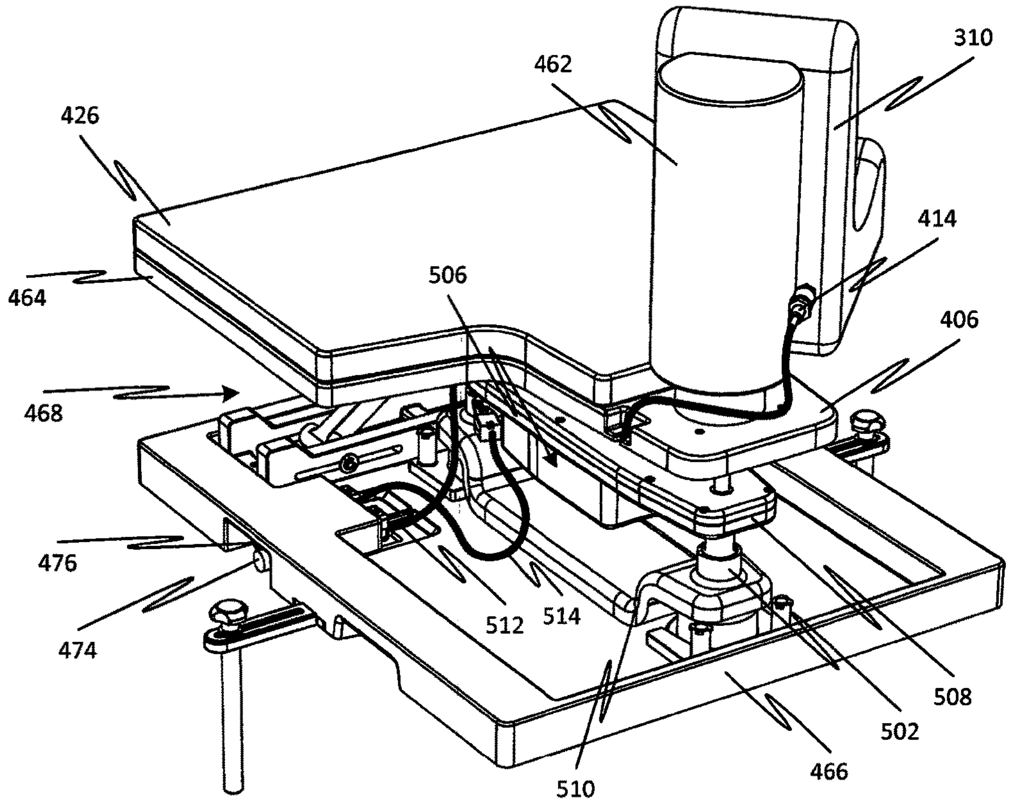
FIG. 17C is a perspective view of the elevated platform assembly of FIG. 17B.

As best shown in FIGS. 17A-17C, the platform assembly 402 can include a scissor assembly 468, a first telescoping hydraulic cylinder actuator 502, a second telescoping hydraulic cylinder actuator 504, and a drive mechanism 506 (e.g., electronic servo drive) that powers cylinder actuators 502, 504. The scissor assembly 468, the cylinder actuators 502, 504, and/or the drive mechanism 506 can be considered together as a single elevation assembly or as separate elevation assemblies of the platform assembly 402. The second telescoping hydraulic cylinder actuator 504 can be disposed along the Z-direction between the peninsular region 406 of the top plate 464 and the bottom plate 466. At an end of the platform assembly 402 opposite the peninsular region 406 along the longitudinal Y-direction, the scissor assembly 468 can be disposed between the top plate 464 and the bottom plate 466. The first telescoping hydraulic cylinder actuator 502 can be disposed along the longitudinal Y-direction between the scissor assembly 468 and the second telescoping hydraulic cylinder actuator 504, and along the Z-direction between the top plate 464 and the bottom plate 466. Since the first and second hydraulic cylinders 502, 504 are disposed on a longitudinal centerline of the top plate 464 in a plan view of the platform assembly 402, the scissor assembly 468 can provide some measure of rotational stability about the centerline by supporting the lateral X-direction ends of the top plate 464.

The hydraulic cylinder actuators 502, 504 can be actuated to change a vertical distance between the plates 464, 466 (e.g., elevation of the supported portion of the patient along the Z-direction). For example, the hydraulic cylinder actuators 502, 504 may provide elevation of up to 150 mm (e.g., 100 mm elevation shown in FIGS. 17B-17C) and a lifting capacity of 150 kg (331 lbs.) or more. The first and second telescoping hydraulic cylinder actuators 502, 504 can be coupled to together at one end via a first brace or bracket 510 and at intermediate portion thereof via a second brace or bracket 508. The second bracket 508 can also support a drive mechanism 506 thereon. In some embodiments, the second bracket 508 can instead house a gear train, couplers, or other power transmission elements that allow drive mechanism 506 to power hydraulic cylinder actuators 502, 504 to cause extension or retraction thereof. Electrical conduit or cable 514 can be connected to the drive mechanism 506 for providing electrical power and/or control signals thereto. For example, the cable 514 may extend from electrical connector 476, which may in turn be coupled by another cable or electrical conduit to the appropriate electrical connector in I/O connector panel 434 of control unit 404.

Figure 18A:
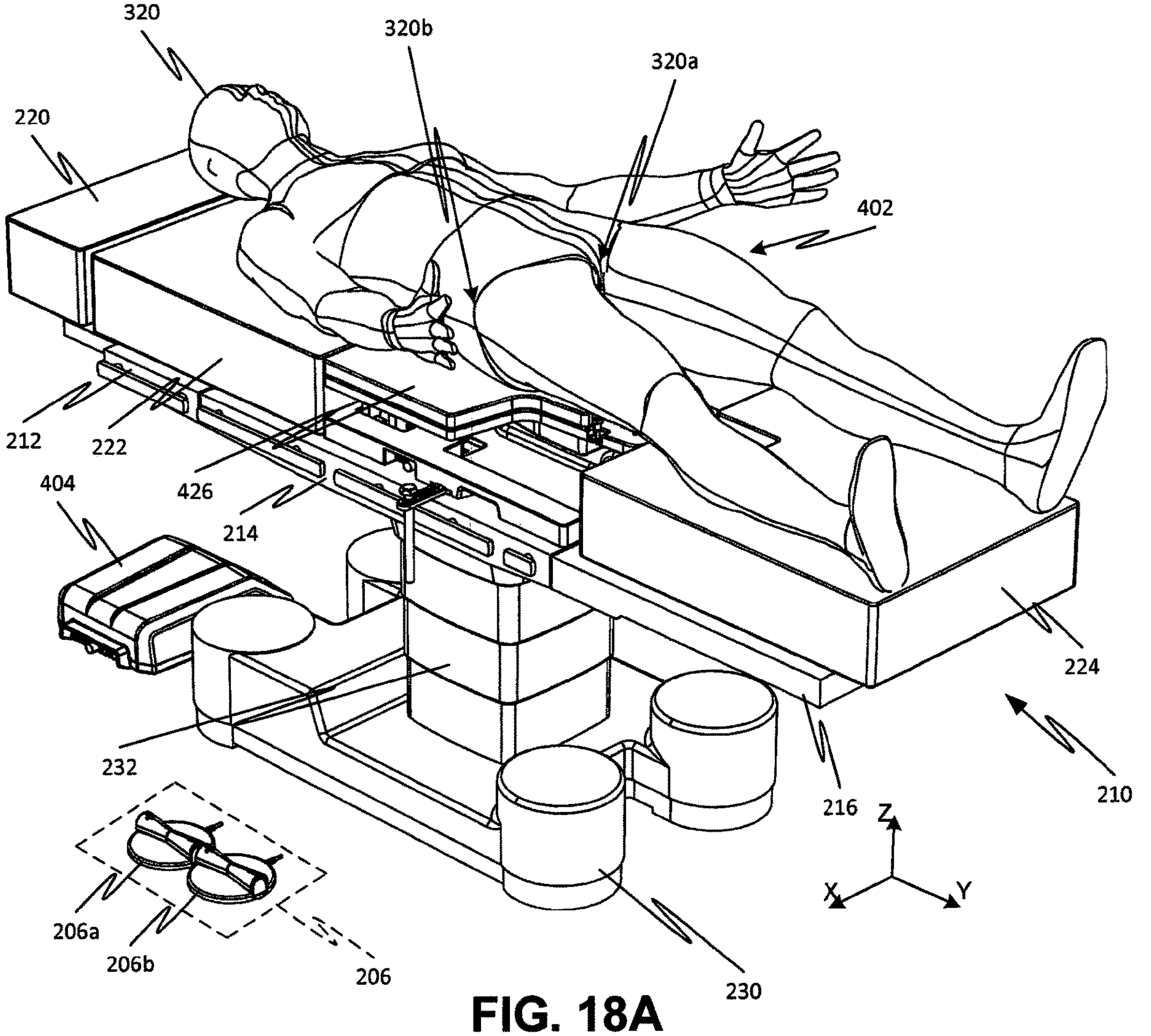
FIGS. 18A-18C are perspective views of the surgical operating table of FIG. 13 supporting a patient during various stages of operation of the surgical positioning system.

Referring to FIGS. 18A-19, an exemplary method 600 for use of surgical positioning system during surgery on a patient 320 will be described. The method can initiate at process block 602, where the surgical operating table 210 is provided with platform assembly 402 of surgical positioning system 400. For example, an existing pelvic support pad (e.g., cushion) of the surgical operating table 210 between torso support pad 222 and leg support pad 224 can be removed and replaced with platform assembly 402. Alternatively or additionally, the support pads 220-224 are part of the surgical positioning system, and process block 602 includes providing the support pads 220-224 on respective support panels 212-216 of the operating table as well as disposing platform assembly 402 between the torso support pad 222 and the leg support pad 224.

In FIG. 19, the method 600 can proceed to process block 604, where the patient is disposed on the surgical operating table with at least a portion of the pelvis being supported on the platform assembly of the surgical positioning system. For example, as shown in FIG. 18A, patient 320 can be disposed face-up on operating table 210, with at least a portion of the pelvic region of the patient being on the support padding 426 of the top plate 464 of the platform assembly 402. The groin region 320*a* may be disposed adjacent to peninsular region 406 of the platform assembly 402.

Figure 18B:
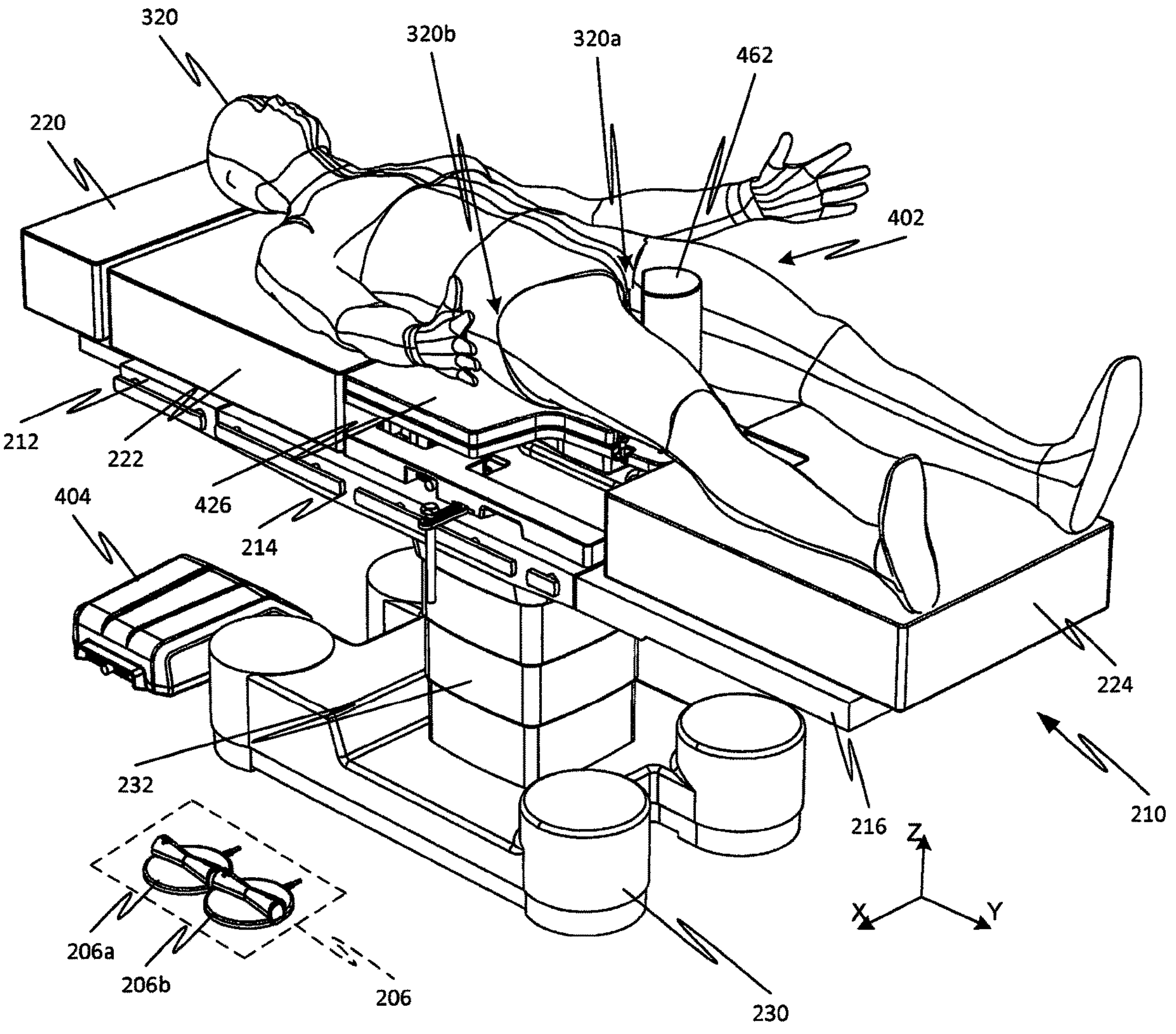

In FIG. 19, the method 600 can proceed to process block 606, where the alignment post is arranged with respect to a groin of the patient. For example, as shown in FIGS. 15A-15B, the alignment post 460 can be inserted into the post mount 409 of the peninsular region 406, and the padding 462 can be installed over the alignment post 460 such that the padding 462 abuts the groin region 320*a*, as shown in FIG. 18B. For example, the padding 462 can be arranged such that the positioning member mounting surface 462*a* faces a hip 320*b* on which surgery is to be performed as part of a hip replacement surgery.

Figure 18C:
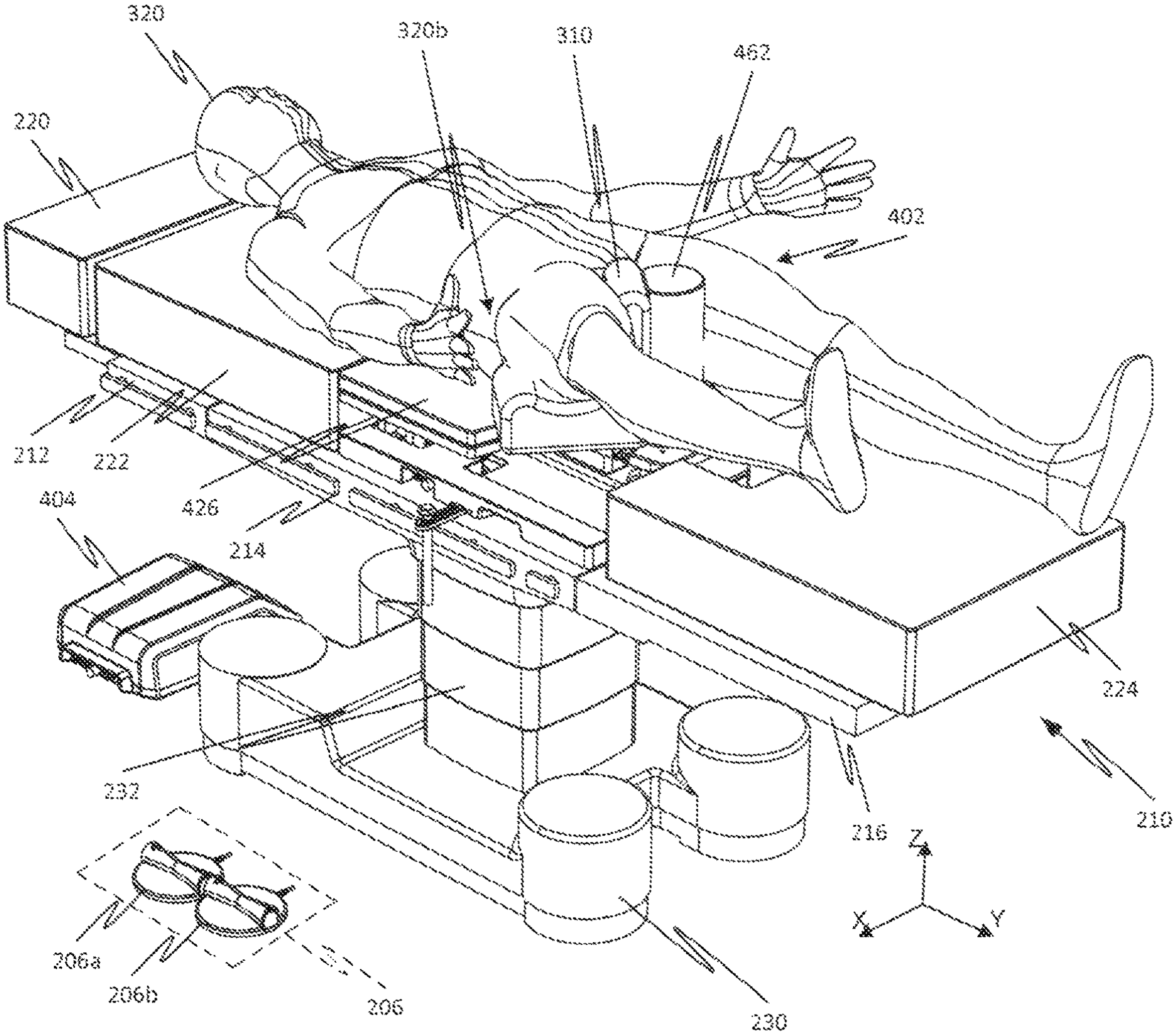

In FIG. 19, the method 600 can proceed to process block 608, where the positioning member is installed on the platform assembly and under a leg or buttock of the patient. For example, a positioning member 310 can be installed by temporarily raising the leg of the patient 320. The positioning member 310 can be installed by mounting surface 310*c* to the padding 462 (e.g., as shown in FIGS. 16A-17C) and attaching the pneumatic connector of the platform assembly 402 to the positioning member 310 (e.g., as shown in FIGS. 16A-16B). Once the positioning member 310 is installed, the leg or buttock of the patient is rested in the cradle formed by surfaces 310*a*-310*b* of positioning member, as shown in FIG. 18C. Although shown in FIGS. 16A-17C and 18C in the fully inflated state, the positioning member will, in general, be initially installed in the fully deflated state. Inflation, whether fully or partially, may occur during particular stages of the surgical procedure, as required by the surgeon. Thus, at least initially, there may be no cradling or minimal cradling offered by the positioning member 310.

In FIG. 19, the method 600 can then proceed to process block 610, where a surgeon proceeds to perform surgery on the patient, for example, a hip replacement surgery. During surgery 610, the surgeon or other user may control the surgical positioning to effect desired position changes in the patient hip region. For example, surgery 610 can include process block 612, where an elevation of the supported portion of the patient's pelvis is changed by actuating the platform assembly, and process block 614, where a femur of the patient is elevated and/or lateralized by changing inflation of the positioning member. Process blocks 612-614 may be performed multiple times during surgery 610 and in any order. For example, the platform assembly 402 can be actuated to elevate the supported pelvis of the patient 320, as shown in FIG. 17B. In particular, the pelvic elevation offered by the platform assembly 402 can allow for extension of the hip 320*b*, thereby providing better exposure of the joint and bones. During another stage of surgery 610, with or without elevation by the platform assembly 402, the positioning member 310 can be inflated. For example, the positioning member 310 can be inflated for femoral stem preparation and insertion, which inflation may elevate and lateralize the proximal femur for ease of broaching. The positioning member 310 can otherwise be deflated during the acetabular preparation and insertion stages.

Although the examples described above employ specific actuation mechanisms for the elevation assemblies and the positioning members, other actuation mechanisms are also possible according to one or more contemplated embodiments. For example, in the platform assembly, the top plate can be moved with respect to the bottom plate using a screw mechanism or gear assembly paired with an appropriate electrical motor, one or more linear actuators that directly or indirectly (e.g., via a scissor mechanism or other translation mechanism) moves the top plate, one or more hydraulic actuators that directly or indirectly (e.g., via a scissor mechanism or other translation mechanism), one or more pneumatic actuators that directly or indirectly (e.g., via a scissor mechanism or other translation mechanism), or any other compact actuation assembly. For example, the positioning member can transition between deflated and inflated states using a pneumatic mechanism (e.g., pressurized air from a pump) or a hydraulic mechanism (e.g., pressurized fluid from a pump).

Although the examples described above focus on the use of the surgical positioning system for hip replacement using the direct anterior approach, embodiments of the disclosed subject matter are not limited thereto. Rather, the surgical positioning systems can be applied to other surgeries and scenarios as well. For example, the surgical positioning system can be used in trauma scenarios, where the surgeon requires access to the femoral head and/or neck to address fracture thereof. In general, the surgical positioning system can be especially useful in any surgical application where the anterior approach is used to access the femur. However, one of ordinary skill in the art will appreciate that the disclosed systems and techniques can be applied to other applications and scenarios as well.

Embodiments of the disclosed subject matter may offer one or more of the following features or advantages, among others:

Modularity and portability—The various components of the surgical positioning system may be disposed in a single transport case that can be carried by a single person and transported between operating venues in a personal automobile.

Cost effective—Since it is designed for use with existing surgical operating tables, the surgical positioning system can avoid the expenses associated with procuring and maintaining a specialized traction table. Moreover, since the system can be simply controlled by a single operator (e.g., the surgeon), the system can avoid the cost of extra staff necessary for operating the specialized traction table.

Simpler setup and patient preparation—The surgical positioning system avoids the leg traction required in specialized traction tables. Since the parts of the patient remain substantially unrestrained, the patient can be more easily transferred, draped, and prepped in the operating room. Moreover, since the system fits mostly within the footprint of existing operating table setups, the system takes up much less room in the operating theater than a specialized traction table.

Improved efficiency—Since the legs of the patient remain free, the surgeon is able to check for stability intraoperatively for both anterior and posterior at-risk positions. Moreover, the surgeon can manually palpate the feet of the patient to check for equal leg lengths, which would otherwise not be available with a specialized traction table without removing the patient therefrom. The imaging alignment marker of the system also allows the surgeon to check the reconstructive anatomy for leg length and offset in real-time during the surgery.

Figure 20:
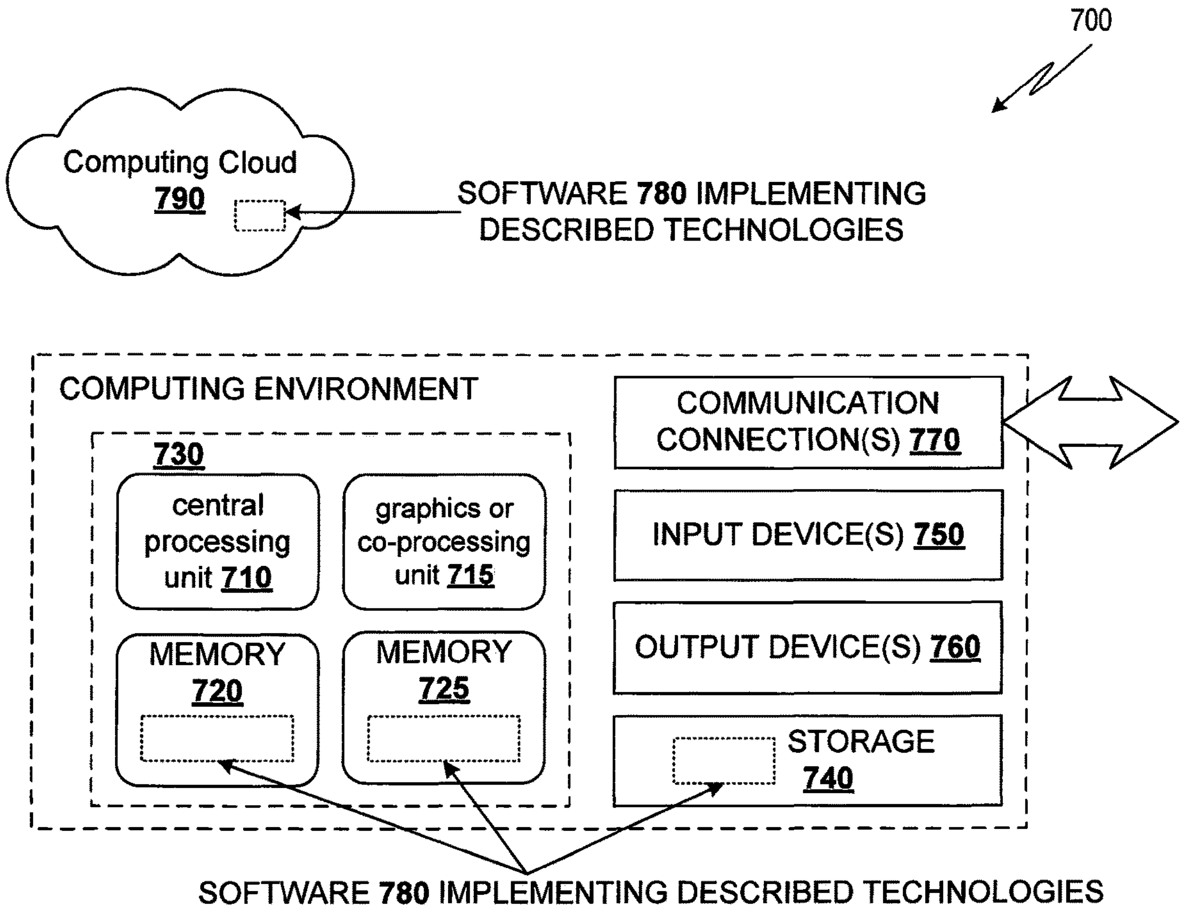
FIG. 20 depicts a generalized example of a suitable computing environment in which the described innovations may be implemented.

In some embodiments, a control module or unit can be implemented within a computing environment, such as computing environment 700 illustrated in FIG. 20. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.).

The computing environment 700 includes one or more processing units 710, 715 and memory 720, 725. In FIG. 20, this basic configuration 730 is included within a dashed line. The processing units 710, 715 execute computer-executable instructions. Each processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way, and which can be accessed within the computing environment 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing environment 700, such as foot pedals 206*a*, 206*b* of input unit 206. The output device(s) 760 may be a display, printer, speaker, CD-writer, or another device that provides output from computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Some embodiments of the disclosed methods can be performed using computer-executable instructions implementing all or a portion of the disclosed technology in a computing cloud 790. For example, the disclosed methods can be executed on processing units 710, 715 located in the computing environment 700 and/or on servers located in the computing cloud 790.

Any of the disclosed control module operations can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). As used herein, the term computer-readable storage media does not include communication connections, such as signals, carrier waves, or other transitory signals. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art have been omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Additional Description of Embodiments of Interest

Clause 1. A system for positioning a patient during surgery, the system comprising:

a platform assembly comprising:
- a first member constructed to be supported on a surgical operating table;
- a second member arranged over the first member and constructed to support thereon at least a first portion of a patient undergoing surgery; and
- an elevation assembly constructed to move the second member with respect to the first member so as to change an elevation of the first portion of the patient with respect to a second portion of the patient; and an alignment post coupled to the platform assembly.

Clause 2. The system of clause 1, wherein the alignment post is constructed to be rotated between a stowed position between the first and second members and a deployed position extending above the second member in a direction away from the first member.

Clause 3. The system of any one of clauses 1-2, wherein the alignment post is rotatably coupled to the first member.

Clause 4. The system of any one of clauses 2-3, wherein:
- in the stowed position, the alignment post is oriented substantially horizontally between the first and second members in a cross-sectional view, and
- in the deployed position, the alignment post is oriented substantially vertically with at least an end portion of the alignment post extending above the second member in the cross-sectional view.

Clause 5. The system of any one of clauses 2-4, wherein the alignment post in the deployed position is arranged such that a groin of the patient is adjacent to a longitudinal side surface of the alignment post.

Clause 6. The system of clause 1, wherein the second member has a peninsular portion arranged between legs of the patient, the peninsular portion has a post mount, and the alignment post has an end supported within the post mount.

Clause 7. The system of any one of clauses 1-6, wherein the alignment post is arranged such that a groin of the patient is adjacent to a longitudinal side surface of the alignment post.

Clause 8. The system of any one of clauses 1-7, further comprising:
- a positioning member coupled to the alignment post and supported on the second member, the positioning member being inflatable between a deflated state and an inflated state,
- wherein, in the inflated state, the positioning member displaces part of the patient thereon vertically with respect to the second member and laterally with respect to the alignment post as compared to the positioning member in the deflated state.

Clause 9. The system of clause 8, wherein the positioning member is arranged to cradle a portion of a leg of the patient proximal to a hip of the patient.

Clause 10. The system of any one of clauses 8-9, wherein the positioning member in the inflated state is constructed and positioned to simultaneously elevate and lateralize a femur of the patient.

Clause 11. The system of any one of clauses 8-10, wherein the positioning member has an L-shape in a side view, with one leg of the L-shape along and coupled at a sidewall of the alignment post, and another leg of the L-shape along and supported on an upper surface of the second member.

Clause 12. The system of any one of clauses 8-11, wherein the positioning member is coupled to the alignment post via a mechanical attachment means and/or magnetic attachment means.

Clause 13. The system of clause 12, wherein the mechanical attachment means comprises a hook-and-loop fastener, permanent adhesive, reusable adhesive, latch, locking clip, or any combination thereof.

Clause 14. The system of any one of clauses 1-13, further comprising a control module operatively coupled to the platform assembly and/or the positioning member, the control module having an input interface constructed to receive first input to control operation of the elevation assembly and to receive second input to control inflation and/or deflation of the positioning member.

Clause 15. The system of clause 14, wherein the input interface comprises one or more foot pedals that are manually actuatable by a user.

Clause 16. The system of clause any one of clauses 14-15, wherein the control module comprises:
- a pneumatic source constructed to supply air to or withdraw air from the positioning member;
- an electrical power source constructed to supply electrical power to an actuator of the elevation assembly to change the elevation of the first portion of the patient; and
- mechanical or electrical components that convert input signals received via the input interface into corresponding operation of the pneumatic source or the electrical power source.

Clause 17. The system of any one of clauses 1-16, wherein the actuator of the elevation assembly comprises a linear actuator or a hydraulic cylinder.

Clause 18. The system of any one of clauses 1-17, wherein the alignment post is coupled to the platform assembly such that an end portion of the alignment post is maintained at a constant height above the second member despite changes in vertical distance between the second member and the first member due to actuation of the elevation assembly.

Clause 19. The system of any one of clauses 1-18, wherein the elevation assembly comprises one or more scissor assemblies, each scissor assembly having a first arm crossing and rotatably attached to a second arm, the first arm having a first end fixed to the first plate member and a second end coupled to the second plate member, the second arm having a first end fixed to the second plate member and a second end coupled to the first plate member, each second end is movable along a longitudinal direction, and the scissor assembly is constructed such that longitudinal motion of the second ends is converted into vertical motion of the second plate member with respect to the first plate member.

Clause 20. The system of any one of clauses 1-19, wherein the second plate member has a peninsular portion arranged to between legs of the patient, the elevation assembly comprises a first hydraulic cylinder, a second hydraulic cylinder, and at least one scissor assembly, the first hydraulic cylinder is disposed between the first plate member and the peninsular portion of the second plate member along a vertical direction, the second hydraulic cylinder is disposed between the first plate member and the at least one scissor assembly along a longitudinal direction.

Clause 21. The system of any one of clauses 1-20, wherein the alignment post comprises padding covering an end portion thereof, and/or the second plate member comprises padding covering a surface facing the first portion of the patient.

Clause 22. The system of any one of clauses 1-21, wherein the second plate member comprises an imaging alignment marker.

Clause 23. The system of clause 22, wherein the imaging alignment marker has a radiopaque grid pattern.

Clause 24. The system of any one of clauses 1-23, further comprising one or more support pads constructed to be supported on the surgical operating table and to support thereon other portions of the patient besides the first portion.

Clause 25. The system of any one of clauses 1-24, wherein at least the second member comprises a top plate with padding arranged thereon to contact the first portion of the patient, and/or the first member comprises a base plate.

Clause 26. A system for positioning a patient during surgery, the system comprising first means for elevating at least a portion of a pelvis of a patient supported on a surgical operating table, and second means for elevating and lateralizing a femur of the patient.

Clause 27. The system of clause 26, further comprising third means for controlling the first means and/or the second means based on inputs from a user of the system, such as a surgeon.

Clause 28. The system of any one of clauses 26-27, wherein the first means comprises an electrical or hydraulic actuator, and/or the second means comprises an inflatable member.

Clause 29. The system of any one of clauses 1-28, wherein the system is constructed as a modular or portable system for transport between and/or use with different surgical operating tables.

Clause 30. The system of any one of clauses 1-28, wherein the system is integrated with the surgical operating table or is constructed as an integral part or component of the surgical operating table.

Clause 31. A surgical operating table comprising the system of any one of clauses 1-30.

Clause 32. A method for performing surgery employing the surgical positioning system of any one of clauses 1-30.

Clause 33. A method, comprising:

- providing a surgical operating table with a platform assembly of a surgical positioning system, the platform assembly comprising a first member, a second member, and an elevation assembly, the first member being supported on the surgical operating table, the second member being arranged over the first member, the elevation assembly being constructed to vertically move the second member with respect to the first member;
- disposing a patient on the surgical operating table with at least a portion of a pelvis of the patient being supported on the second member;
- arranging an alignment post of the surgical positioning with respect to a groin region of the patient;
- installing an inflatable positioning member on the alignment post such that at least a portion of the inflatable positioning member is between the second member and a leg or buttock of the patient; and
- performing a surgery on the patient, the performing comprising:
  - elevating the supported portion of the pelvis of the patient by actuating the elevation assembly of the platform assembly,
  - elevating and/or lateralizing a femur of the patient by changing inflation of the inflatable positioning member, or
  - any combination thereof.

Clause 34. The method of clause 33, wherein the arranging the alignment post comprises rotating the alignment post from an initial stowed position between the first and second members to a deployed position extending above the second member and away from the first member.

Clause 35. The method of clause 33, wherein the arranging the alignment post comprises inserting an end of the alignment post into a post mount in a peninsular portion of the second plate member, the peninsular portion being between legs of the patient, and the inserted alignment post extends above the second plate member and away from the first plate member.

Clause 36. The method of any one of clauses 33-35, wherein the positioning member is inflatable between a deflated state and an inflated state, and/or the inflatable positioning member is installed on the alignment post in the deflated state.

Clause 37. The method of any one of clauses 33-36, wherein, before or after the installing the inflatable positioning member, a pneumatic source is connected to the positioning member.

Clause 38. The method of any one of clauses 33-37, wherein the elevation assembly comprises an electrical linear actuator and/or a hydraulic actuator.

Clause 39. The method of any one of clauses 33-38, wherein the performing the surgery comprises an anterior approach to access the femur of the patient.

Clause 40. The method of any one of clauses 33-39, wherein the performing the surgery comprises replacement of a hip of the patient via a direct anterior approach.

Clause 41. The method of any one of clauses 33-40, wherein the second member comprises a top plate with padding arranged thereon to contact the first portion of the patient, and/or the first member comprises a base plate.

GENERAL CONSIDERATIONS

All features described herein are independent of one another, and, except where structurally impossible, all features described herein can be used in combination with any other feature described herein. For example, alignment marker 280 described with respect to FIG. 4E can be used with platform assembly 402 of FIGS. 13-18. In another example, the electrical-drive elevation mechanism employed in platform assembly 202 of FIGS. 2-12, or components thereof, can be employed in platform assembly 402 of FIGS. 13-18. In still another example, the hydraulic-drive elevation mechanism employed in platform assembly 402 of FIGS. 13-18, or components thereof, can employed in platform assembly 202 of FIGS. 2-12.

For purposes of this description, certain aspects, advantages, and novel features of the embodiments of this disclosure are described herein. The disclosed methods, assemblies, modules, and systems should not be construed as being limiting in any way. Instead, the present disclosure is directed toward all novel and nonobvious features and aspects of the various disclosed embodiments, alone and in various combinations and sub-combinations with one another. The methods, assemblies, modules, and systems are not limited to any specific aspect or feature or combination thereof, nor do the disclosed embodiments require that any one or more specific advantages be present, or problems be solved. The technologies from any example can be combined with the technologies described in any one or more of the other examples.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "offer," "provide," or "achieve" to describe the disclosed methods. These terms are high-level abstractions of the actual operations that are performed. The actual operations that correspond to these terms may vary depending on the particular implementation and are readily discernible by one of ordinary skill in the art.

As used herein, the terms "integral part," "integrally formed," and "unitary construction" refer to a construction that does not include any welds, fasteners, or other means for securing separately formed pieces of material to each other, or is otherwise considered to be permanently attached together.

As used herein, operations that occur "simultaneously" or "concurrently" occur generally at the same time as one another, although delays in the occurrence of operation relative to the other due to, for example, spacing between components, are expressly within the scope of the above terms, absent specific contrary language.

As used herein, the singular forms "a," "an," and "the" include the plural forms unless the context clearly dictates otherwise. Furthermore, use of the terms "including" or "having," as well as other forms such as "includes," "included," "has," or "had," are intended to have the same effect as "comprising" and thus should not be understood as limiting. In addition, the term "coupled" generally means physically, mechanically, chemically, magnetically, and/or electrically coupled or linked and does not exclude the presence of intermediate elements between the coupled or associated items absent specific contrary language. As used herein, "and/or" means "and" or "or," as well as "and" and "or."

Directions and other relative references (e.g., inner, outer, upper, lower, left, right, top, bottom, etc.) may be used to facilitate discussion of the drawings and principles herein, but are not intended to be limiting. For example, certain terms may be used such as "inside," "outside,", "top," "bottom," "front," "rear," "side," "left," right," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" part can become a "lower" part simply by turning the object over. Nevertheless, it is still the same part and the object remains the same.

In view of the many possible embodiments to which the principles of the disclosed technology may be applied, it should be recognized that the illustrated examples are only preferred examples and should not be taken as limiting the scope of the disclosed technology. Rather, the scope of the invention is defined by the following claims. I therefore claim as my invention all that comes within the scope and spirit of these claims.

The invention claimed is:

1. A method, comprising:

in a system for positioning a patient during surgery, the system comprising a platform assembly, the platform assembly comprising a first member constructed to be supported on a surgical operating table, a second member, and an elevation assembly, the second member being arranged over the first member, the elevation assembly being constructed to vertically move the second member with respect to the first member, disposing a patient on the surgical operating table with at least a portion of a pelvis of the patient being supported on the second member;

arranging an alignment post of the system with respect to a groin region of the patient, the alignment post coupled to the platform assembly;

installing an inflatable positioning member on the alignment post such that at least a portion of the inflatable positioning member is between the second member and a leg or buttock of the patient; and performing a surgery on the patient, the performing comprising:

elevating the supported portion of the pelvis of the patient by actuating the elevation assembly of the platform assembly, elevating and/or lateralizing a femur of the patient by changing inflation of the inflatable positioning member, or any combination thereof.

2. The method of claim 1, wherein the arranging the alignment post comprises inserting an end of the alignment post into a post mount in a peninsular portion of the second member, the peninsular portion being between legs of the patient, and the inserted alignment post extends above the second member and away from the first member.

3. The method of claim 1, wherein the positioning member is inflatable between a deflated state and an inflated state, and the inflatable positioning member is installed on the alignment post in the deflated state, and wherein, before or after the installing the inflatable positioning member, a pneumatic source is connected to the positioning member.

4. The method of claim 1, wherein the performing the surgery comprises an anterior approach to access the femur of the patient.

5. The method of claim 1, wherein the performing the surgery comprises replacement of a hip of the patient via a direct anterior approach.

6. A system for positioning a patient during surgery, the system comprising:

a platform assembly comprising:

a first member constructed to be supported on a surgical operating table;

a second member arranged over the first member and constructed to support thereon at least a first portion of a patient undergoing surgery; and an elevation assembly constructed to move the second member with respect to the first member so as to change an elevation of the first portion of the patient with respect to a second portion of the patient;

an alignment post coupled to the platform assembly; and a positioning member coupled to the alignment post and supported on the second member, the positioning member being inflatable between a deflated state and an inflated state, wherein, in the inflated state, the positioning member displaces part of the patient thereon vertically with respect to the second member and laterally with respect to the alignment post as compared to the positioning member in the deflated state.

7. A system for positioning a patient during surgery, the system comprising:

a platform assembly comprising:

a first member constructed to be supported on a surgical operating table;

a second member arranged over the first member and constructed to support thereon at least a first portion of a patient undergoing surgery; and an elevation assembly constructed to move the second member with respect to the first member so as to change an elevation of the first portion of the patient with respect to a second portion of the patient;

an alignment post coupled to the platform assembly; and a positioning member coupled to the alignment post and supported on the second member, wherein the positioning member is configured to displace part of the patient thereon vertically with respect to the second member and laterally with respect to the alignment post.

8. The system of claim 7, further comprising:

wherein the positioning member is inflatable between a deflated state and an inflated state, and wherein, in the inflated state, the positioning member displaces part of the patient thereon vertically with respect to the second member and laterally with respect to the alignment post as compared to the positioning member in the deflated state.

9. The system of claim 8, wherein the positioning member is arranged to cradle a portion of a leg of the patient proximal to a hip of the patient, and wherein the positioning member in the inflated state is constructed and positioned to simultaneously elevate and lateralize a femur of the patient.

10. The system of claim 8, further comprising a control module operatively coupled to the platform assembly and the positioning member, the control module having an input interface constructed to receive first input to control operation of the elevation assembly and to receive second input to control inflation and/or deflation of the positioning member.

11. The system of claim 10, wherein the control module comprises:

a pneumatic source constructed to supply air to or withdraw air from the positioning member;

an electrical power source constructed to supply electrical power to an actuator of the elevation assembly to change the elevation of the first portion of the patient; and mechanical or electrical components that convert input signals received via the input interface into corresponding operation of the pneumatic source or the electrical power source.

12. The system of claim 11, wherein the actuator of the elevation assembly comprises a linear actuator or a hydraulic cylinder.

13. The system of claim 7, wherein the second member has a peninsular portion arranged between legs of the patient, the peninsular portion has a post mount, and the alignment post has an end supported within the post mount.

14. The system of claim 13, wherein the alignment post is arranged such that a groin of the patient is adjacent to a longitudinal side surface of the alignment post.

15. The system of claim 1, wherein the positioning member has an L-shape in a side view, with one leg of the L-shape along and coupled at a sidewall of the alignment post, and another leg of the L-shape along and supported on an upper surface of the second member.

16. The system of claim 1, wherein the positioning member is coupled to the alignment post via a mechanical attachment means and/or magnetic attachment means, wherein the mechanical attachment means comprises a hook-and-loop fastener, permanent adhesive, reusable adhesive, latch, locking clip, or any combination thereof.

17. The system of claim 7, wherein:

the elevation assembly comprises one or more scissor assemblies, each scissor assembly having a first arm crossing and rotatably attached to a second arm, the first arm having a first end fixed to the first member and a second end coupled to the second member, the second arm having a first end fixed to the second member and a second end coupled to the first member, each second end is movable along a longitudinal direction, and the scissor assembly is constructed such that longitudinal motion of the second ends is converted into vertical motion of the second member with respect to the first member.

18. The system of claim 7, wherein the alignment post comprises padding covering an end portion thereof, and/or the second member comprises padding covering a surface facing the first portion of the patient.

19. The system of claim 7, wherein the second member comprises an imaging alignment marker, and wherein the imaging alignment marker has a radiopaque grid pattern.

20. The system of claim 7, further comprising one or more support pads constructed to be supported on the surgical operating table and to support thereon other portions of the patient besides the first portion, and wherein the second member comprises a top plate with padding arranged thereon to contact the first portion of the patient, and the first member comprises a base plate.

* * * * *